(12) United States Patent
Wright et al.

(10) Patent No.: US 6,803,538 B2
(45) Date of Patent: Oct. 12, 2004

(54) LASER WELDING SYSTEM

(75) Inventors: Christopher J. Wright, Orangeville (CA); Warren Perry, Everett (CA)

(73) Assignee: Honda Canada Inc. (CA)

( * ) Notice: Subject to any disclaimer, the term of this patent is extended or adjusted under 35 U.S.C. 154(b) by 0 days.

(21) Appl. No.: 10/229,261

(22) Filed: Aug. 28, 2002

(65) Prior Publication Data

US 2003/0057191 A1 Mar. 27, 2003

Related U.S. Application Data

(60) Provisional application No. 60/324,926, filed on Sep. 27, 2001, and provisional application No. 60/315,927, filed on Aug. 31, 2001.

(51) Int. Cl.$^7$ ............................................... B23K 26/00
(52) U.S. Cl. ............................ 219/121.63; 219/121.65; 219/121.82
(58) Field of Search ........................ 219/121.63, 121.64, 219/121.65, 121.66, 121.82, 121.85

(56) References Cited

U.S. PATENT DOCUMENTS

| | | | |
|---|---|---|---|
| 4,067,458 A | 1/1978 | Schneider et al. | |
| 4,672,165 A | 6/1987 | Ishii et al. | ..................... 219/97 |
| 5,676,518 A | 10/1997 | Okubo et al. | |
| 6,204,469 B1 | 3/2001 | Fields, Jr. et al. | |
| 6,261,701 B1 | 7/2001 | Fields, Jr. | |
| 6,455,803 B1 | 9/2002 | Fields, Jr. et al. | ...... 219/121.63 |
| 6,476,344 B1 | 11/2002 | Fields, Jr. et al. | ...... 219/121.63 |
| 6,479,786 B1 * | 11/2002 | Fields et al. | ........... 219/121.63 |

FOREIGN PATENT DOCUMENTS

| | | | |
|---|---|---|---|
| DE | 3626974 A1 | 8/1986 | ........... B23K/26/02 |
| JP | 11-0049103 A | 2/1999 | |
| WO | WO00/51775 | 9/2000 | |

OTHER PUBLICATIONS

Aug. 19, 2001, Delphion patent search.

* cited by examiner

*Primary Examiner*—M. Alexandra Elve
(74) *Attorney, Agent, or Firm*—Katten Muchin Zavis Rosenman

(57) ABSTRACT

Disclosed herein is a laser welding system having a travel path to carry a first blank and a second blank. An upstream clamp assembly and a downstream clamp assembly are positioned on the travel path and each of the upstream and downstream clamp assemblies are movable to an open position to allow the first blank to pass through the upstream clamp assembly to a first location within the downstream clamp assembly. A laser welding source is directed at a weld location on the travel path between the upstream and downstream clamp assemblies. At least one locating means is operable to locate the first weld edge adjacent the weld location. A first displacement means displaces the first weld edge against the locating means. The downstream clamp assembly is movable from the open position to a closed clamped position to clamp the first blank with the first weld edge adjacent the weld location. The locating means is operable to be withdrawn from the travel path. The upstream clamp assembly is movable from the open position to an intermediate position, which is selected to guide the second blank to pass through the upstream clamp assembly in a substantially coplanar relationship with the first blank so that the second weld edge makes contact with, but not past, the first weld edge. A second displacement means displaces the second blank to a location adjacent the weld location where the second weld edge abuts the first weld edge. The upstream clamp assembly is movable from the intermediate position to a closed clamped position to clamp the second blank and the the laser welding source is operable to fuse the first and second weld edges blanks together.

37 Claims, 27 Drawing Sheets

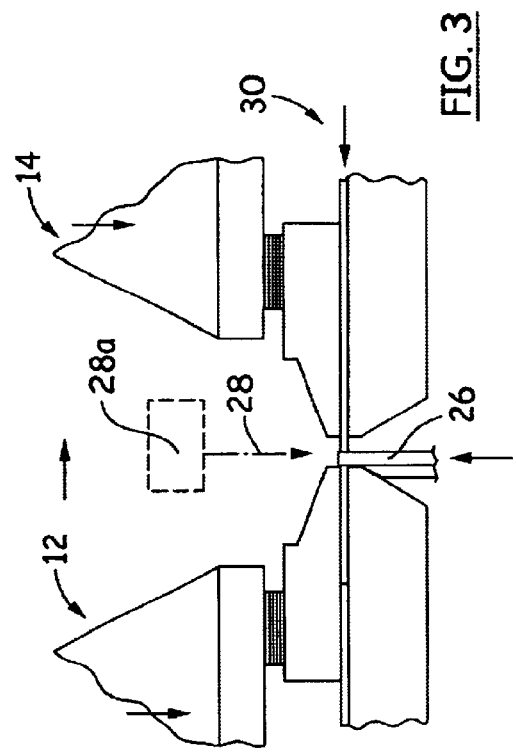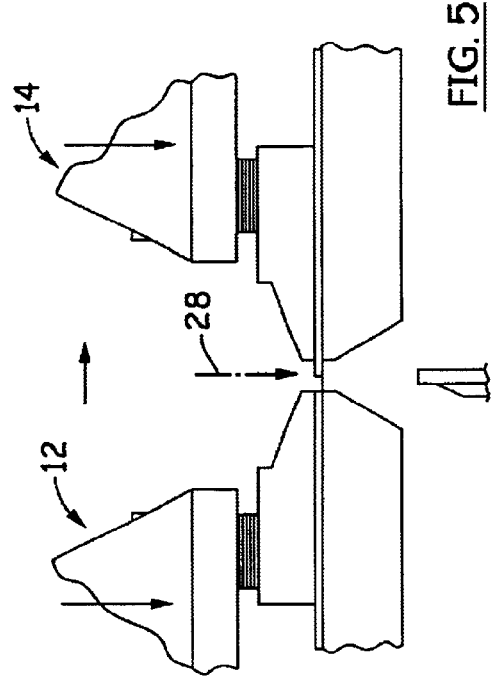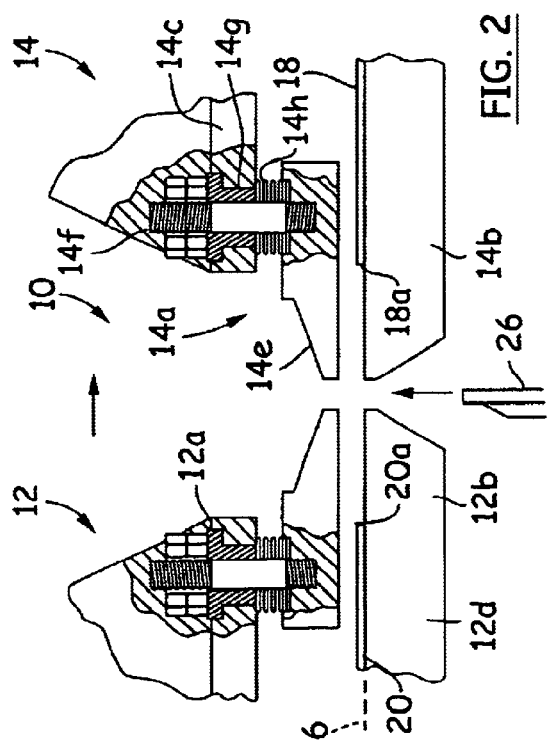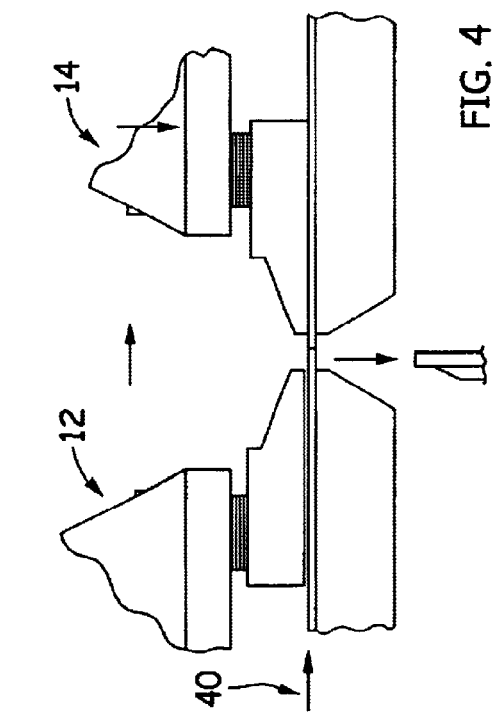

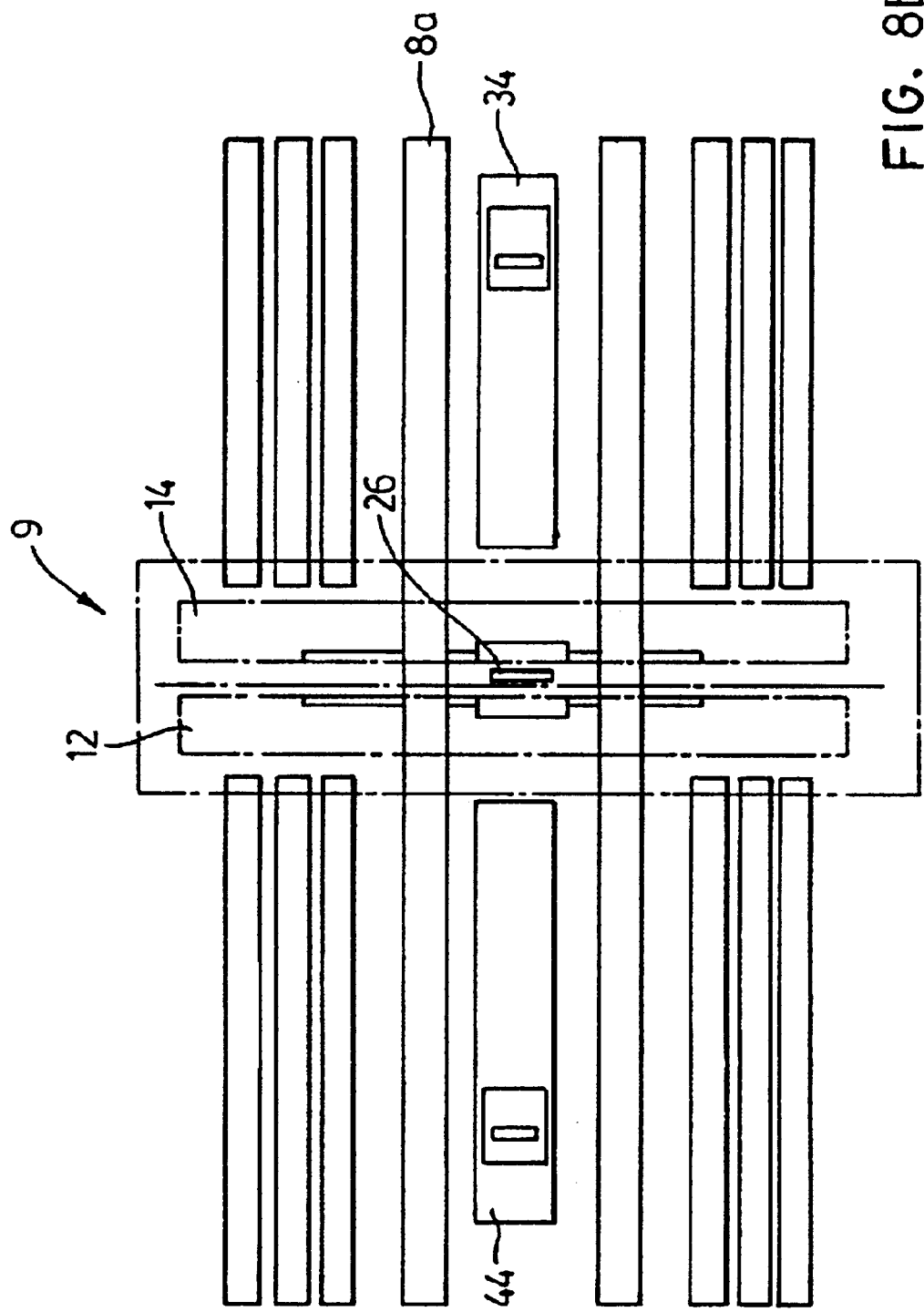

LASER WELDING SYSTEM

PRIORITY CLAIM AND INCORPORATION BY REFERENCE TO CO-PENDING APPLICATIONS

The applicants claim priority benefit under Title 35, United States Code, Section 119(e) to U.S. provisional application Ser. No. 60/315,927, filed Aug. 31, 2001 entitled CLAMPING DEVICE and to U.S. provisional application Ser. No. 60/324,926, filed Sep. 27, 2001 and entitled IMPROVEMENTS TO LASER WELDING SYSTEM is also incorporated herein by reference. The entire subject matter of both U.S. provisional application Ser. No. 60/315,927 and U.S. provisional application Ser. No. 60/324,926 is incorporated herein by reference.

BACKGROUND OF THE INVENTION

1. Field of the Invention

The present invention relates to processing systems and more particularly, but not necessarily exclusively to welding systems to manufacture tailored blanks.

2. Description of the Related Art

The automobile industry has, over the years, achieved significant improvements in the operating efficiency of the automobiles they produce. This has, in large part, been achieved by the reduction in the weight of the vehicle while maintaining its structural integrity. A major proportion of the weight of the vehicle is from its steel components, such as the chassis and doors, hood and trunk lids. Often, there are areas in the structure of these components that need to remain of a greater thickness, such as in the region of the door hinges, while there are other areas, such as in the door frame, that can be of relatively thinner wall. It is common in this case to reinforce the otherwise relatively thin door frame in the regions to carry the hinges with a stiffener to provide the necessary reinforcement. However, this step increases the parts count and is a source for additional cost.

The automobile industry has, in recent years, been working to implement a welding process to fabricate what is popularly known as a tailored blank which has a relatively thick portion which is welded to a relatively thin portion, so that it can be later stamped into a part with a thick portion being in place to provide strength, reduce the overall part count and weight.

A significant improvement to laser welding lines is disclosed in U.S. Pat. No. 6,204,469 entitled LASER WELDING SYSTEM, assigned to HONDA GIKEN KOGYO KABUSHIKI KAISHA. The subject matter of this patent is incorporated herein by reference. This will be referred to as the Honda '469 patent.

While the system described in the '469 patent has provided a substantial increase in the speed, accuracy and integrity of tailored blanking welds, there is a continuing need to make further improvements, particularly in the speed of the operation.

Accordingly, the present invention seeks to improve certain aspects of the welding processes such as those used to form tailored blanks.

SUMMARY OF THE INVENTION

In one of its aspects a laser welding system, comprising: a travel path to carry a first blank and a second blank, the first blank having a first weld surface and the second blank having a second weld surface, the first and second blanks being ready to be welded together to form a weld seam along the first and second weld surfaces;

an upstream clamp assembly and a downstream clamp assembly positioned on the travel path;

each of the upstream and downstream clamp assemblies being movable to an open position to allow the first blank to pass through the upstream clamp assembly to a first location within the downstream clamp assembly;

a laser welding source directed at a weld location on the travel path between the upstream and downstream clamp assemblies;

at least one locating means operable to locate the first weld edge adjacent the weld location;

first displacement means to displace the first weld edge against the locating means;

the downstream clamp assembly being movable from the open position to a closed clamped position to clamp the first blank with the first weld edge adjacent the weld location;

the locating means being operable to be withdrawn from the travel path;

the upstream clamp assembly being movable from the open position to an intermediate position, which is selected to guide the second blank to pass through the upstream clamp assembly in a substantially coplanar relationship with the first blank so that the second weld edge makes contact with, but not past, the first weld edge;

second displacement means to displace the second blank to a location adjacent the weld location where the second weld edge abuts the first weld edge;

the upstream clamp assembly being movable from the intermediate position to a closed clamped position to clamp the second blank;

the laser welding unit operable to fuse the first and second weld edges blanks together.

In one embodiment, the system further comprises first and second lateral positioning means for respectively positioning the first and second blanks relative to the travel path. Each blank has a pair of side edges and each lateral positioning means includes a pair of lateral abutment members, each for engaging a corresponding side edge, and a lateral servo positioner for positioning each lateral abutment member. Lateral control means is provided for incrementally controlling the lateral servo positioners. Each of the lateral abutment members includes an upwardly directed flange and a plurality of stop members mounted on the flange.

In one embodiment, each of the claim assemblies includes an upper clamp beam and a lower clamp beam, a plurality of clamp elements fastened to the upper beam and a clamp drive unit for displacing the upper clamp beam relative to the lower clamp between the open and closed positions.

In one embodiment, the first displacement means includes at least one first engagement portion for engaging the first blank and a first drive portion for driving the first engagement portion. The first engagement portion includes a first engagement member, in the form of an upwardly directed flange and a blank abutment member mounted on the flange, for engaging an edge on the first blank opposite the first weld edge and the first drive portion includes a first servo positioner which is aligned for movement along the travel path for displacing the first engagement member; and first control means for incrementally controlling the first servo positioner. A first actuator unit is provided for actuating the blank abutment member between an operable position in the travel path and an inoperable position below the travel path.

In one embodiment, the second displacement means includes at least one second engagement portion for engaging the second blank and a second drive portion for driving the second engagement portion. The second engagement portion includes a second engagement member, in the form of an upwardly directed flange and a blank abutment member mounted on the flange, for engaging an edge of the second blank opposite the second weld edge and the second drive portion includes a second servo positioner which is aligned for movement along the travel path for displacing the second engagement member; and second control means for incrementally controlling the second servo positioner. A second actuator unit is provided for actuating the blank abutment member between an operable position in the travel path and an inoperable position below the travel path.

In one embodiment, the locating means includes a locating member movable between an operable position in the travel path and an inoperable position below the travel path and a locating drive assembly for driving the locating member between the operative and inoperative positions. The locating drive assembly has a carriage member mounted for lateral movement relative to the travel path on a third servo positioner, the carriage supporting a vertically oriented actuator with an output shaft coupled to the locating member. A third control means is also provided for incrementally controlling the third servo positioner.

In still another of its aspects, the present invention provides a method of welding a pair of blanks, comprising:

a step for providing a travel path to carry a first blank and a second blank;

a step for providing an upstream clamp assembly and a downstream clamp assembly positioned on the travel path;

a step for opening the upstream and downstream clamp assemblies;

a step for conveying a first blank along the travel path and through the upstream clamp assembly to the downstream clamp assembly;

a step for positioning a laser welding unit at a weld location between the upstream and downstream clamp assemblies;

a step for interrupting the travel path at the weld location with at least one blank locator;

a step for displacing the first blank until its trailing to-be-welded edge abuts the locator;

a step for clamping the downstream clamp assembly to clamp the first blank in its position against the locator;

a step for withdrawing the locator from the travel path;

a step for moving the upstream clamp assembly to an intermediate position;

a step for conveying a second blank along the travel path to the upstream clamp assembly;

a step for displacing the second blank until its leading to-be-welded edge makes edge-to-edge contact with, but does not pass over, the trailing to-be-welded edge of the first blank;

a step for closing the upstream clamp assembly; and a step for operating the laser welding unit to form a weld seam along the abutting edges of the first and second blanks.

In still another of its aspects, the present invention provides a laser welding system, comprising:

a travel path to carry a first blank and a second blank;

an upstream clamp assembly and a downstream clamp assembly positioned on the travel path;

each of the upstream and downstream clamp assemblies being movable to an open position to allow the first blank, in a first step, to pass through the upstream clamp assembly and be delivered to the downstream clamp assembly;

a laser welding unit positioned at a weld location between the upstream and downstream clamp assemblies; at least one locating means operable, in a second step, to interrupt the travel path at the weld location;

first displacement means operable, in a third step, to displace the first blank until its trailing to-be-welded edge abuts the locating means;

the downstream clamp assembly movable, in a fourth step, from the open position to a closed clamped position to clamp the first blank;

the locating means operable, in a fifth step, to be withdrawn from the travel path;

the upstream clamp assembly movable, in a sixth step, from the open position to an intermediate position, to allow a second blank to be delivered to the upstream clamp assembly;

second displacement means, operable in a seventh step with the upstream clamp assembly to displace the second blank until its leading to-be-welded edge makes edge-to-edge contact therewith, while guiding constraining movement of the second blank to prevent the second blank from passing over the trailing to-be-welded edge of the first blank;

the upstream clamp assembly movable, in an eighth step, from the intermediate position to a closed clamped position to clamp the second blank;

the laser welding unit operable, in a ninth step, to fuse the first and second blanks together along their abutting edges.

In still another of its aspects, the present invention provides a clamping system, comprising:

a travel path to carry a first blank and a second blank;

an upstream clamp assembly and a downstream clamp assembly positioned on the travel path;

each of the upstream and downstream clamp assemblies movable to an open position to allow the first blank, in a first step, to pass through the upstream clamp assembly and be delivered to the downstream clamp assembly;

at least one locating means operable, in a second step, to interrupt the travel path between the upstream and downstream clamp assemblies;

first displacement means operable, in a third step, to displace the first blank until one edge abuts the locating means;

the downstream clamp assembly movable, in a fourth step, from the open position to a closed clamped position to clamp the first blank;

the locating means operable, in a fifth step, to be withdrawn from the travel path;

the upstream clamp assembly movable, in a sixth step, from the open position to an intermediate position, to allow a second blank to be delivered to the upstream clamp assembly;

second displacement means, operable in a seventh step with the upstream clamp assembly to displace the second blank until one edge makes edge-to-edge contact therewith, while constraining movement of the second blank to prevent the second blank from passing over the edge of the first blank; and the upstream clamp assembly movable, in an eighth step, from the intermediate position to a closed clamped position to clamp the second blank.

In still another of its aspects, the present invention provides a method of processing a pair of blanks along a pair of abutting edges, comprising:

a step for providing a travel path to carry a first blank and a second blank;

a step for providing an upstream clamp assembly and a downstream clamp assembly positioned on the travel path;

a step for opening the upstream and downstream clamp assemblies;

a step for conveying a first blank along the travel path and through the upstream clamp assembly to the downstream clamp assembly;

a step for positioning a processing unit between the upstream and downstream clamp assemblies;

a step for interrupting the travel path adjacent the processing unit with at least one blank locator;

a step for displacing the first blank until its trailing to-be-processed edge abuts the locator;

a step for clamping the downstream clamp assembly to clamp the first blank in its position against the locator;

a step for withdrawing the locator from the travel path;

a step for moving the upstream clamp assembly to an intermediate position;

a step for conveying a second blank along the travel path to the upstream clamp assembly;

a step for displacing the second blank until its leading to-be-processed edge makes edge-to-edge contact with, but does not pass over, the trailing to-be-processed edge of the first blank;

a step for closing the upstream clamp assembly; and a step for operating the processing unit to process the abutting edges of the first and second blanks.

In still another of its aspects, there is provided a conveyor system for delivering, successively, two groups of blanks of different dimensions along a travel path to a downstream processing station and for orienting each blank to arrive at the station in a precisely controlled orientation, comprising:

a continuous magnetic conveyor;

first and second lateral positioning arms, each for positioning one corresponding side edge of each blank, each of the lateral positioning arms being incrementally driven by first and second servo positioners respectively;

the first and second servo positioners being movable between an inoperative position and an operative blank-engaged position, wherein the blank-engaged position is selected to locate each blank of the first group in a precisely controlled first orientation and each blank of the second group in a precisely controlled second orientation;

a longitudinal positioning assembly operable for positioning either a leading edge or a trailing edge on the blank, said longitudinal positioning assembly being incrementally driven by a third servo positioner;

servo control means for controlling the first, second and third servo positioners, said control means being operative in:

a first phase to adjust the operative and inoperative positions according to the dimensions of the blanks in the first group, a second phase to shuttle the first and second servo positioners between their inoperative and operative positions;

a third phase to adjust the operative and inoperative positions according to the dimensions of the blanks in the second group; and a fourth phase to shuttle the first and second servo positioners between their inoperative and operative positions.

In one embodiment, each of the lateral positioning arms includes an upwardly directed frame member and a plurality of stop members mounted on the frame member. The magnetic conveyor has a travel path and the longitudinal positioning assembly further comprises a carriage mounted for travel along the travel path. A plurality of setting pins are provided along with one or more drive units for driving the setting pins between an operative position interrupting the travel path and an inoperable position below the travel path. The setting pins are located at a position in the travel path to engage the trailing edge of the blank.

In still another of its aspects, there is provided a method for delivering, successively, two groups of blanks of different dimensions along a travel path to a downstream processing station and for orienting each blank to arrive at the station in a precisely controlled orientation, each group of blanks having two sets of common blanks, comprising:

providing a conveyor arrangement to convey the blanks along a travel path;

providing a first pair of lateral positioning arms on opposite sides of the travel path at a first location;

providing a second pair of lateral positioning arms on opposite sides of the travel path at a second location;

incrementally controlling the position of each of the arms by a servo positioner;

processing the blanks of the first group by:
presetting the parameters of the servo positioner to define an inoperative position for each arm and an operative position wherein, in the operative position, the arms engage opposing side edge of a corresponding blank to locate the corresponding blank of the first group in a precisely controlled orientation;
delivering, successively, each blank of the first set to the first location on the travel path;
delivering, successively, each blank of the second set to the second location on the travel path;

processing the blanks of the second group by;
presetting the parameters of the servo positioner to define an inoperative position, for each arm and an operative position wherein, in the operative position, the arms engage opposing side edge of a corresponding blank to locate the corresponding blank of the second group in a precisely controlled orientation;
delivering, successively, each blank of the first set to the first location on the travel path; and
delivering, successively, each blank of the second set to the second location on the travel path.

In yet another of its aspects, the present invention provides a system for delivering blanks to a processing station, comprising:

an input location for providing a plurality of blanks to be processed;

a conveyor having an upstream end near the input location and a downstream end near the processing station;

a reject location for receiving rejected blanks;

a robotic arm operable to transfer blanks from the input location to the upstream end of the conveyor;

a blank pick up assembly coupled to the robot arm and having a plurality of engaging members for engaging the blank in order to deliver the blank to a sensing location which is spaced from the pickup location, and at least one sensing means for sensing a normal condition and a reject condition at the sensing location;

the normal condition being defined by the presence of only a single blank at the pickup assembly, wherein the robot arm is operable, in the normal condition to transfer the single blank from the sensing location to the upstream end of the conveyor;

the reject condition being defined by the presence of two or more blanks at the pickup assembly, the pickup assembly further comprising at least one supplemental engagement means operable in the reject condition to engage the two or more blanks with sufficient strength to enable the robot arm to transfer the two or more blanks from the sensing location to the reject location and thereafter to to release the two or more blanks from the pickup assembly to deliver the two or more blanks to the reject location.

In one embodiment, the engagement means includes a plurality of suction devices positioned on the pickup assembly for establishing a suction connection between the blank and the pickup assembly. The blanks are ferromagnetic and the sensing means is operable to sense changes in magnetic flux. The robotic arm has a coupling end carrying the pickup assembly, the pickup assembly further comprising a frame arrangement supporting the suction devices, the sensing means being positioned in order to be immediately adjacent the blank when the robotic arm lifts the blank from the input location, in order to sense changes in flux. The supplemental engagement means, in this case, includes one or more magnets to deliver a magnetic force to the two or more blanks, but could include such things as ultrasonic sensors and the like, provided they are capable to detecting a change in a wave or signal indicating the presence of one, or alternatively more than one, blank at the pick up assembly in the sensing location.

Preferably, the supplemental engagement means includes displacement means which is operable in the reject condition to displacing the magnet from an inoperative position in which the magnet is spaced a sufficient distance from the blank so as to exert substantially no attraction thereon to an operative position sufficiently close to the blank so as to exert a magnet attraction force thereon.

In still another of its aspects, there is provided a method for delivering blanks to a processing station, comprising the steps of:

providing an input location for providing a plurality of blanks to be processed;

providing a conveyor having an upstream end near the input location near a downstream end at the processing station;

providing a reject location for receiving rejected blanks;

providing a blank pickup unit;

lifting a blank from the input location with the pickup unit;

sensing for the presence of more than one blank at the pickup unit;

if a number of blanks are sensed, delivering the pickup unit to the reject location and releasing the blanks; and if only one blank is sensed, delivering the blank to the upstream end of the conveyor.

In still another of its aspects, there is provided a method for delivering blanks to a processing station, comprising:

a step for providing an input location for providing a plurality of blanks to be processed;

a step for providing a conveyor having an upstream end near the input location and a downstream end at the processing station a step for providing a reject location for receiving rejected blanks;

a step for providing a blank pickup unit;

a step for lifting a blank from the input location with the pickup unit;

a step for sensing for the presence of more than one blank at the pickup-unit;

if a number of blanks are sensed, a step for delivering the pickup unit to the reject location and releasing the blanks; or if only one blank is sensed, a step for delivering the blank to the upstream end of the conveyor.

In still another of its aspects, there is provided a method for increasing the processing speed of a laser blanking line, comprising the steps of:

providing two input locations for providing a source for two sets of blanks in a first group;

providing a travel path having an upstream end, the travel path extending though a shearing station to a laser welding station;

providing a reject location for receiving rejected blanks;

providing a pair of blank pickup units, one adjacent each of the input locations;

lifting a blank from the input location with each pickup unit;

sensing for the presence of more than one blank at each pickup unit;

if a number of blanks are sensed, delivering the pickup unit to the reject location and releasing the blanks;

if only one blank is sensed, delivering the blank to the travel path for delivery to the shearing station shearing one end of each of the blanks; and delivering the blanks to the laser welding station along the travel path for welding together the sheared ends of the blanks to form a welded blank.

BRIEF DESCRIPTION OF THE DRAWINGS

Several preferred embodiments of the present invention will be provided, by way of example only, with reference to the appended drawings, wherein:

FIGS. 2 to 5 are schematic views of a clamp assembly in the welding line of FIG. 1;

FIG. 8b is a schematic view of a laser weld station portion of the plant of FIG. 8, implementing the welding line of FIG. 1;

FIGS. 21 and 22 are perspective views of two portions of the shearing station of FIG. 8a;

DESCRIPTION OF THE PREFERRED EMBODIMENTS

Figure 1:
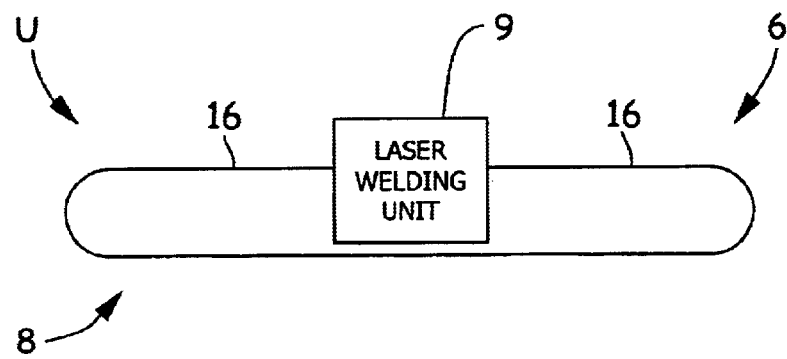
FIG. 1 is a schematic view of a portion of the welding line.

FIG. 1 illustrates, schematically, a portion of a weld station line shown at 6 including a conveyor 8 and a laser welding unit shown at 9. The welding line 6 is part of a welding plant shown in FIGS. 8. Several other stations of the welding plant will be described below.

Referring to FIGS. 2 to 5, the welding station includes a clamp device 10 including an upstream clamp assembly 12 and a downstream clamp assembly 14, each of which is located on a travel path 16 (provided in this case by the conveyor 8). In this example, conveyor 8 is arranged to carry a thick blank 18 and a thin blank 20, in this case for the production of "tailored blanks" for the fabrication of automobile parts or other manufactured articles.

The blanks 18, 20 are formed from a ferromagnetic material, such as coated or uncoated cold rolled mild steel, stainless steel, or the like. Conveyor 8 is continuous and has a pair of is magnetized sections 8a (shown in FIG. 9) to hold the steel blanks during transfer. Magnetized conveyors of this type are well known in the automobile industry and are, for example, described in the Honda '469 patent.

Referring to FIGS. 2 to 5, the clamp assemblies 12 and 14 respectively have mating clamp jaws 12a, 12b and 14a, 14b. In this case, the clamp assembly 12 is "upstream" of the clamp assembly 14 relative to the travel path 16 whose direction generally travels from left to right in FIGS. 2 to 5. The function of each clamp assembly relates in part to its position on the travel path and will therefore also, in some cases, be hereinafter referred to as the "upstream" and "downstream" clamp assemblies 12 and 14 respectively. Both are movable to an open position as shown in FIG. 2. Here, the open position is defined by a spacing between the inner surfaces of the jaws which is at least sufficient to permit the thick blank to travel along the travel path 16, through the upstream clamp assembly 12 to its position as shown in FIG. 2 in the downstream clamp assembly 14.

Figure 9:
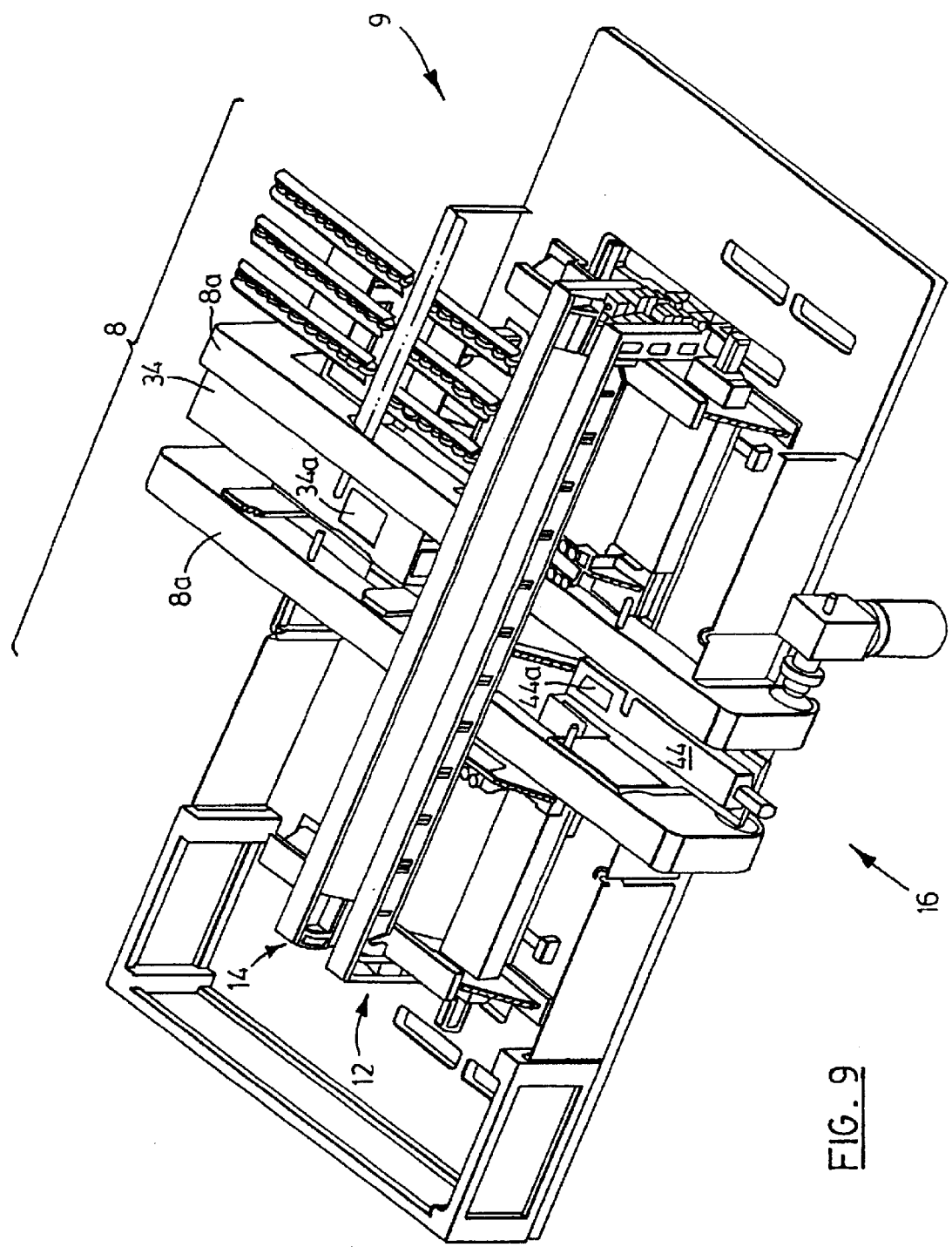
FIG. 9 is a fragmentary perspective view of a laser weld station in the plant of FIG. 8.
Figure 10:
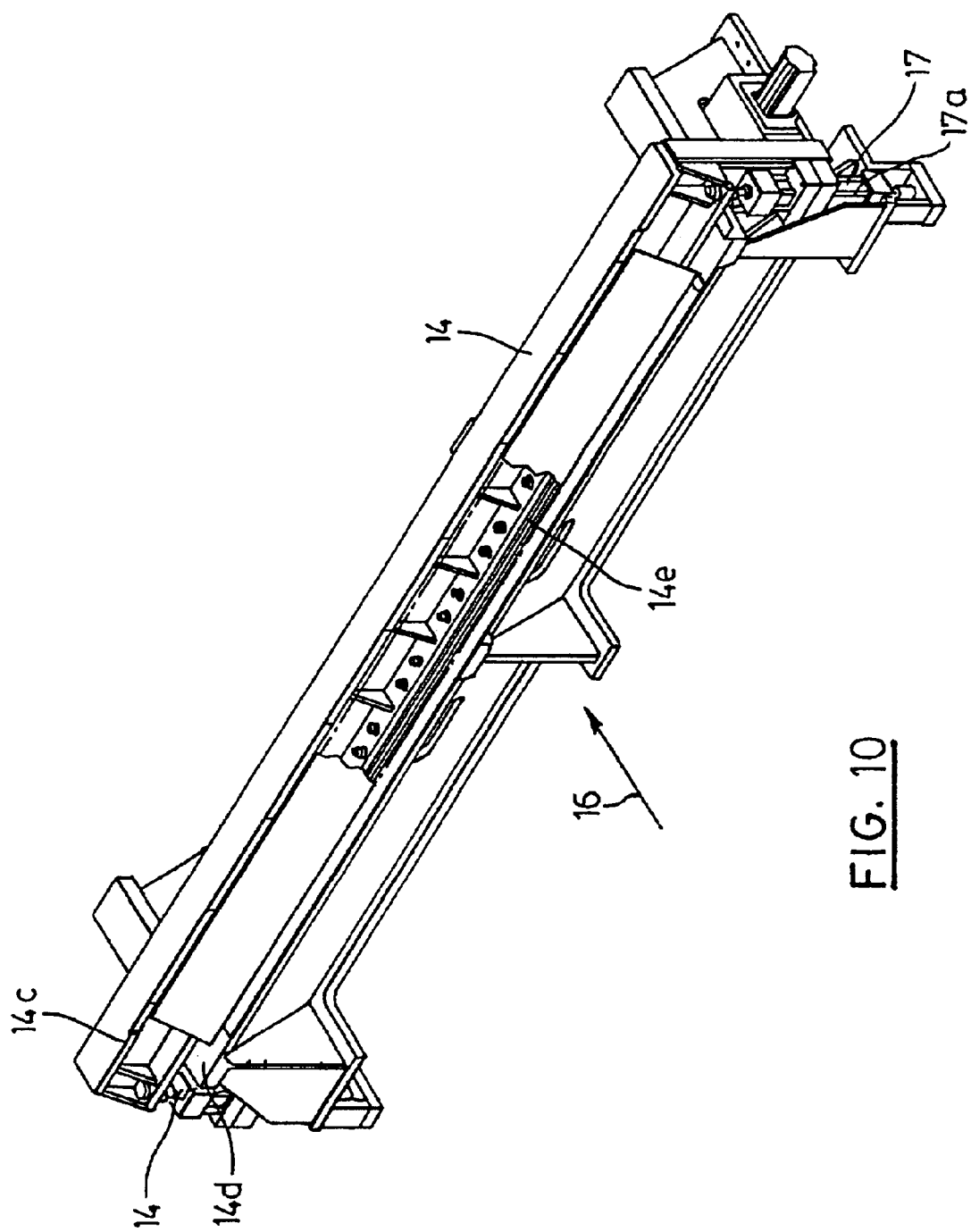
FIG. 10 is a perspective view of a clamp portion of the weld station of FIG. 9.
Figure 10A:
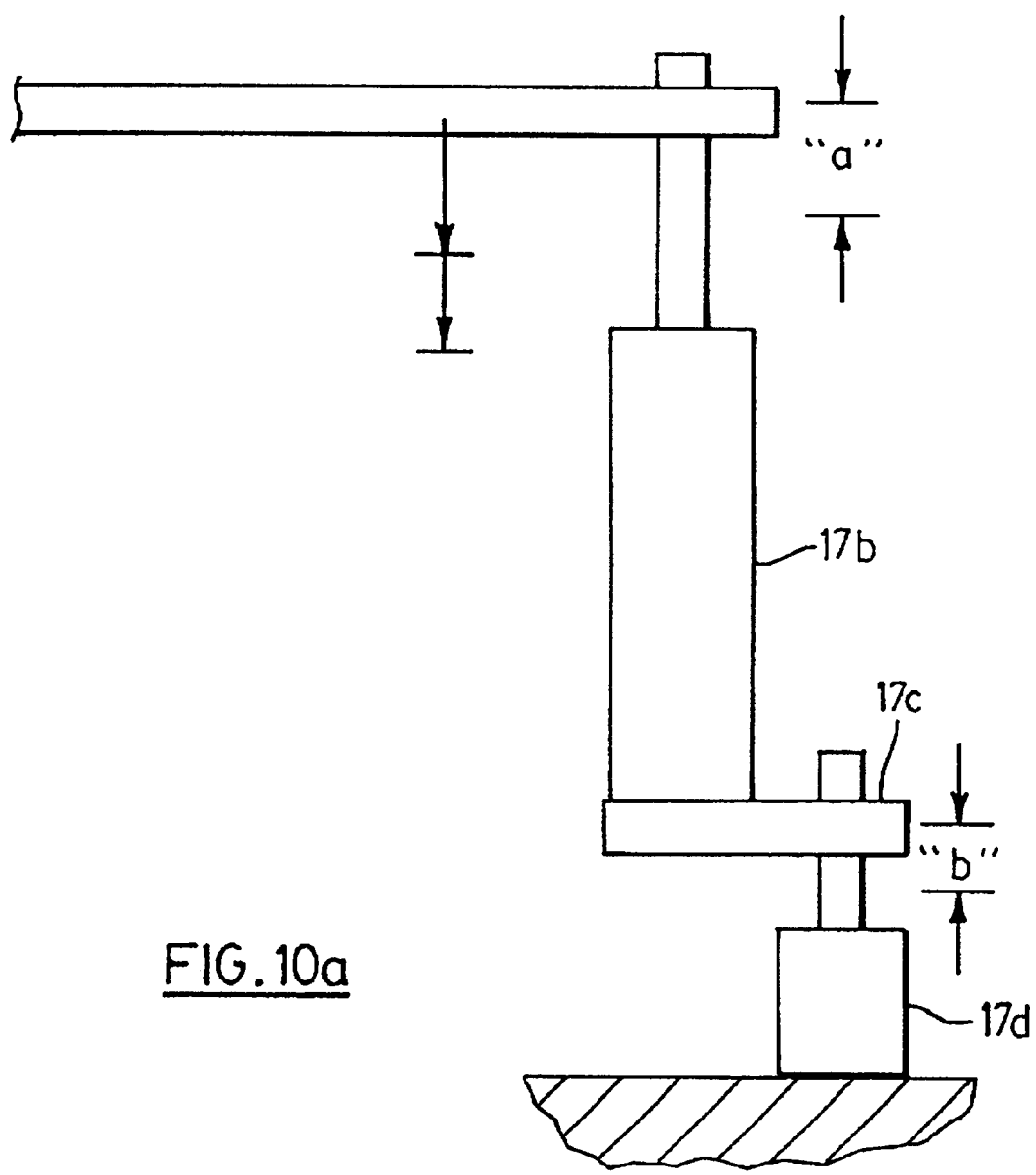
FIG. 10a is a schematic view of a hydraulic ram segment of the clamp portion shown in FIG. 9.
Figure 11:
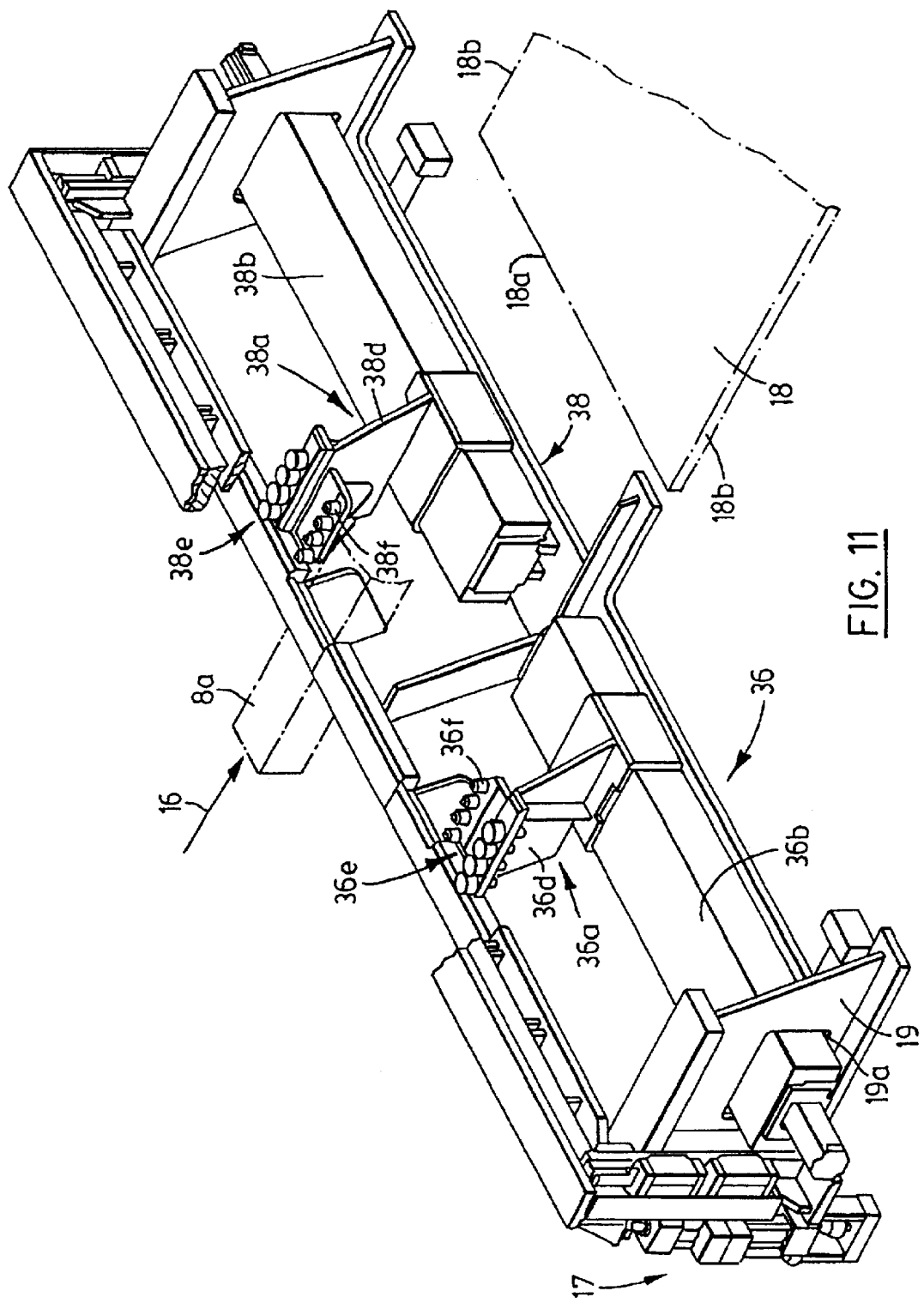
FIG. 11 is another perspective view of the clamp portion of FIG. 10.
Figure 12:
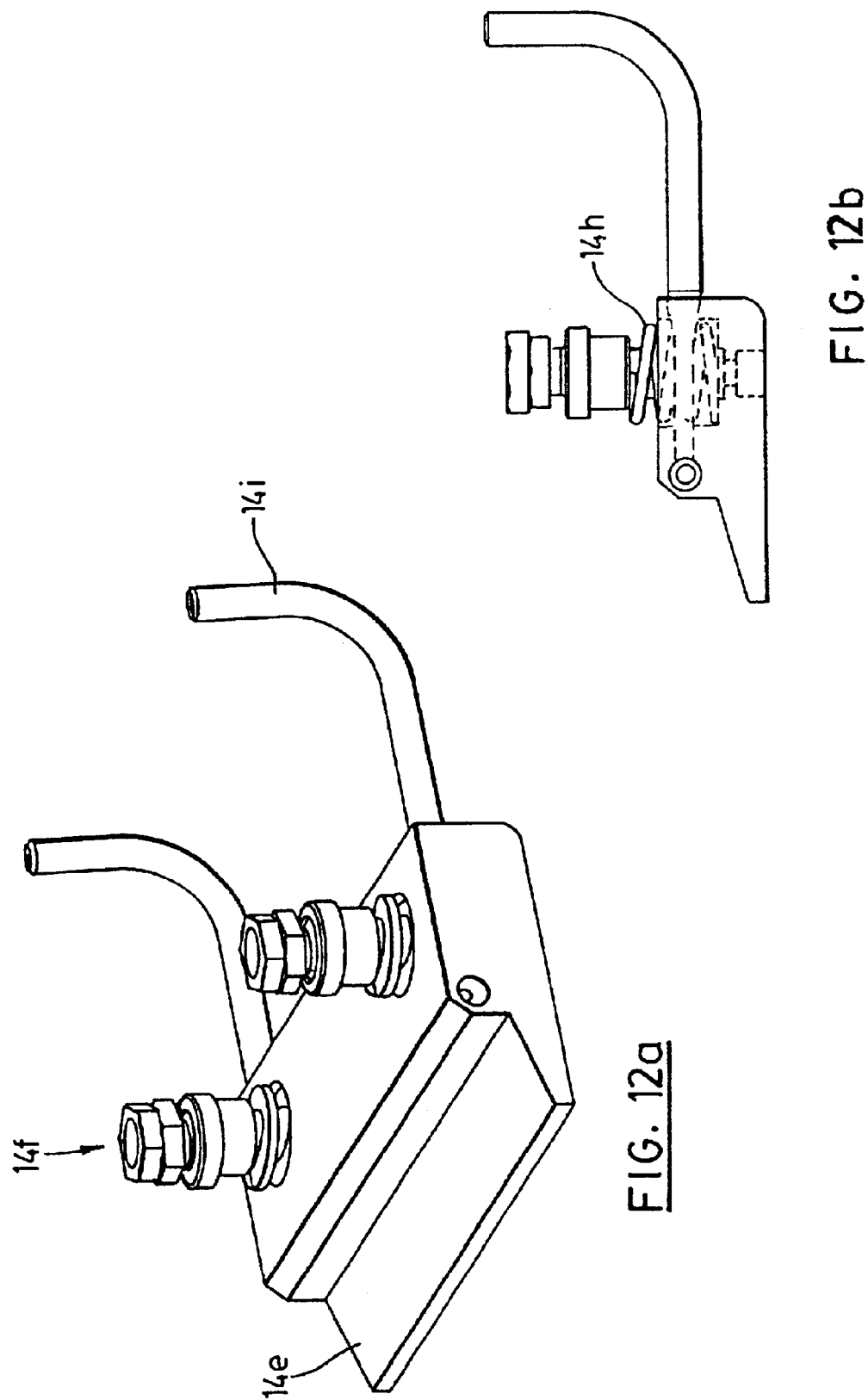
FIGS. 12a) and b) are perspective and end views of one element of the clamp portion of FIG. 11.

Further details of the downstream clamp assembly 14 are shown in FIGS. 2, 9, 10, 11, 12a, 12b, it being understood that the upstream clamp assembly 12 is essentially identical to the downstream clamp assembly 14, except of course for its opposite orientation and its position on the travel path 16. The upper and lower clamp jaws 14a and 14b include an upper clamp beam 14c and a lower clamp beam 14d respectively, as shown in FIG. 10. In this case, a plurality of clamp elements 14e (shown in FIG. 2) are fastened to each of the upper clamp beam 14c by way of a nut and bolt arrangement 14f extending through a passage 14g and spring biased downwardly by way of spring 14h. As shown in FIGS. 12a and 12b, each clamp element 14e is also provided with a pair of cooling fluid passages 14i to circulate coolant through the clamp elements during the welding operation Referring to FIGS. 10 and 11, a clamp drive unit 17, in this case including a pair of back to back hydraulic rams 17a (shown schematically in FIG. 10a) displaces the upper clamp beam relative to the lower clamp between the open and closed positions. The back to back hydraulic rams 17a further include a first ram 17b which has a cylinder whose end-to-end displacement equals the clamp distance from the open position to the intermediate position. The first ram 17b is anchored to a frame 17c which is moveable under the action of a second ram 17d, the latter of which has an end-to-end displacement which equals the clamp distance from the intermediate position to the closed position.

Referring to FIG. 11, a clamp frame assembly, generally shown at 19, supports the upper and lower clamp beams and includes a central passage 19a and a pair of lateral positioning members are located in the central passage, as will be described below.

Figure 13:
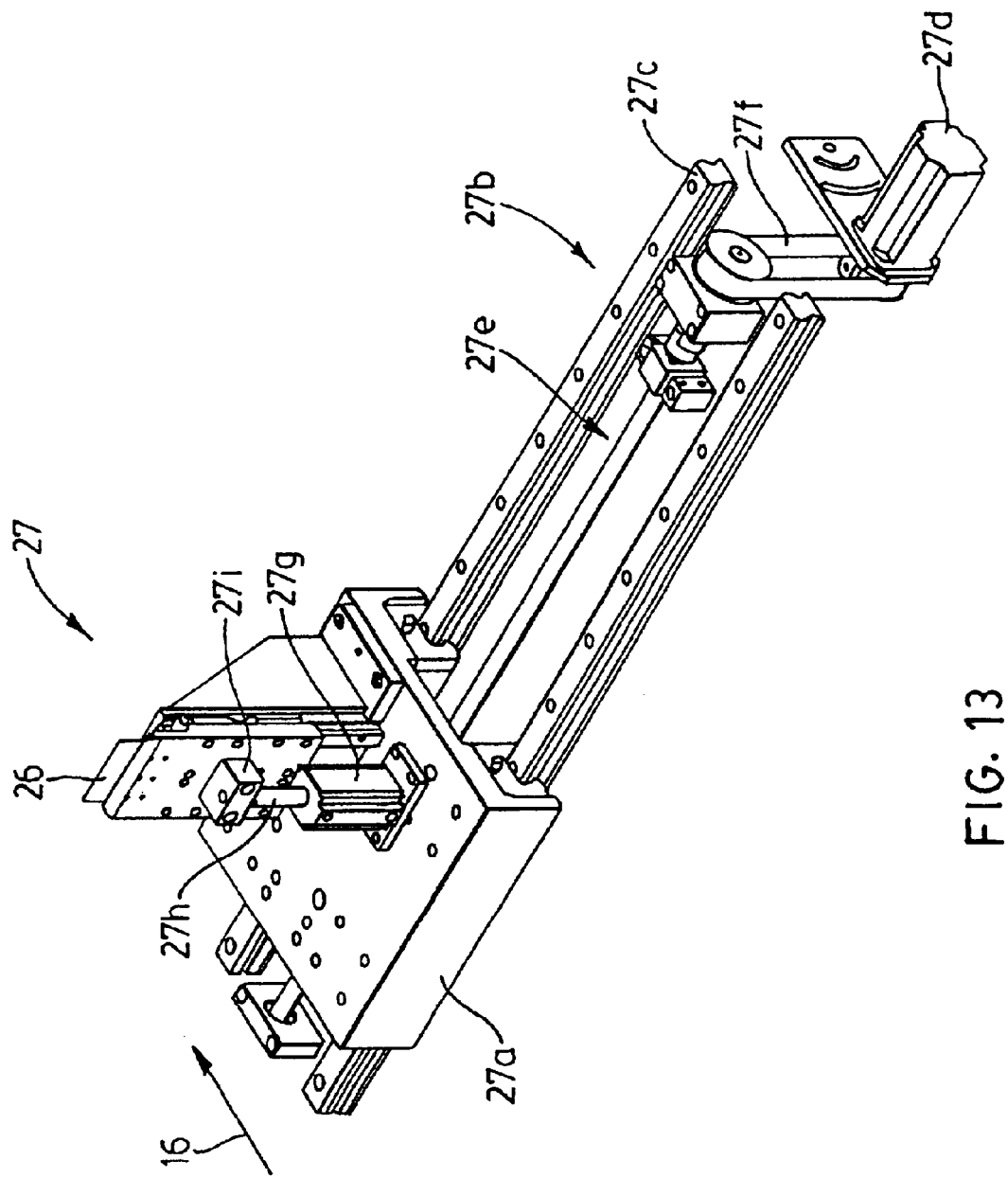
FIG. 13 is a perspective view of another portion of the weld station of FIG. 9.

Referring more particularly to FIGS. 2 to 5 8b and 13, one or more locating members 26 are located between the upstream and downstream clamp assemblies. The locating members 26 may be in the form of setting pins, stops or positioners, each driven by a locating drive assembly 27, as shown in FIG. 13. In this case, only one locating member is used. The locating drive assembly 27 has a carriage member 27a mounted for lateral travel (that is transverse to the travel path 16) on a servo positioner 27b having a pair of elongate track members 27c, a drive motor 27d which drives a linear screw drive 27e by way of a belt 27f. The carriage support supports a vertically oriented actuator 27g with an output shaft 27h coupled to the locating member by way of block 27i.

The actuator 27f is operable to move the locating member 26 between an inoperative position as shown in FIG. 2 to an operative position as shown in FIG. 3, in the latter position to locate the thick blank in a weld position beneath the location of a weld laser beam (shown schematically at 28). The weld laser 28 is provided by a weld unit 28a, the details of which can be found in the Honda '469 patent. As can be seen in FIG. 4, the locating member 26 is movable back to its inoperative position after the thick blank is suitably positioned in its weld position and clamped therein by the downstream clamp assembly 14. It will also be seen in FIG. 3 that the downstream clamp assembly is moved to an intermediate position between the open position of FIG. 1 and the closed position of FIG. 4.

Figure 6:
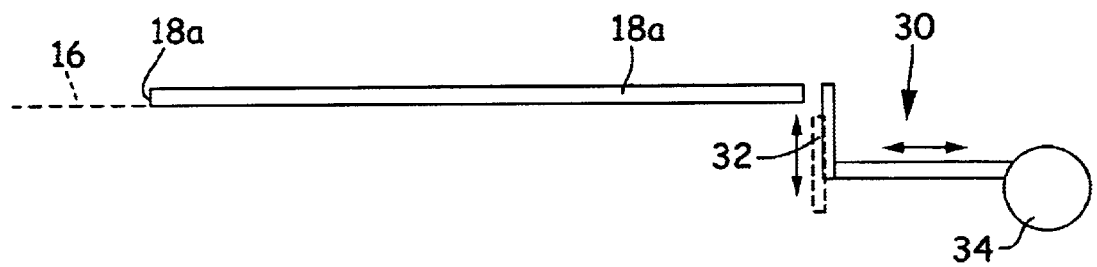
FIGS. 6 and 7 are schematic views of two portions of the clamp assembly of FIGS. 2 to 5.
Figure 7:
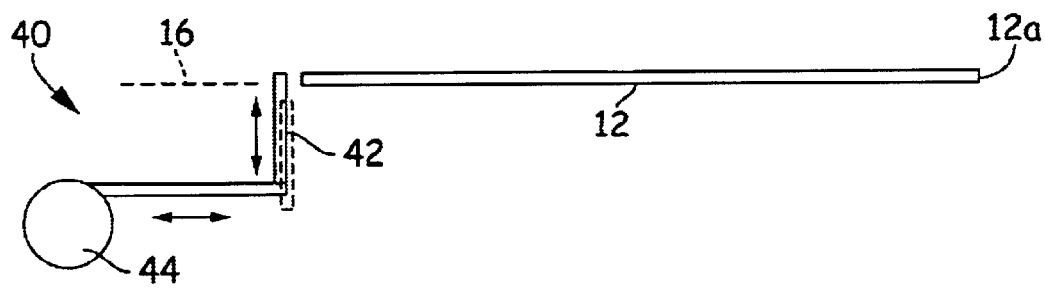
Figure 14B:
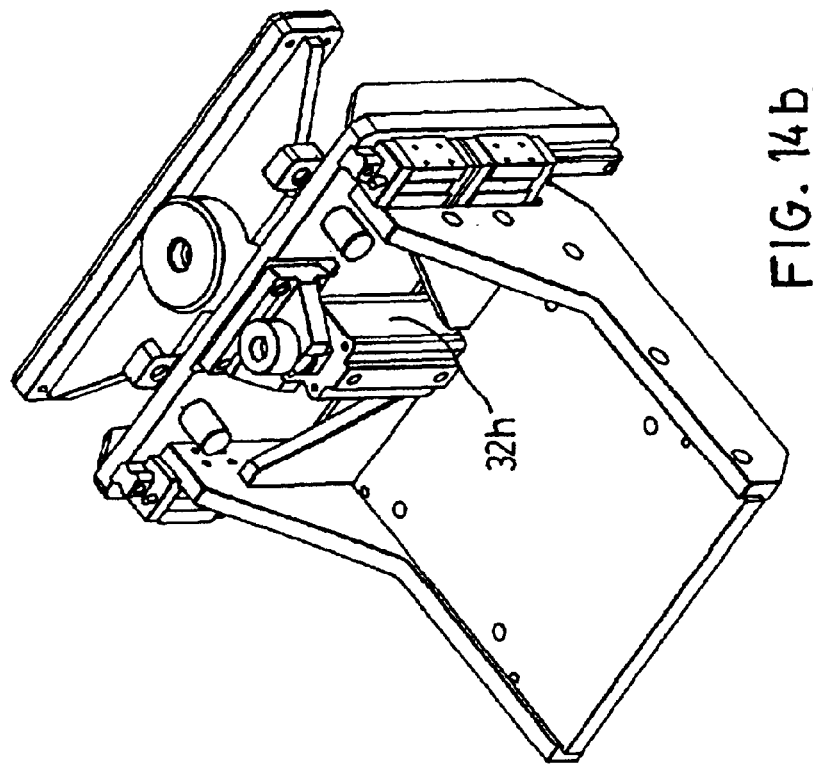
FIGS. 14a) and b) are perspective views of another portion of the weld station of FIG. 9.
Figure 14A:
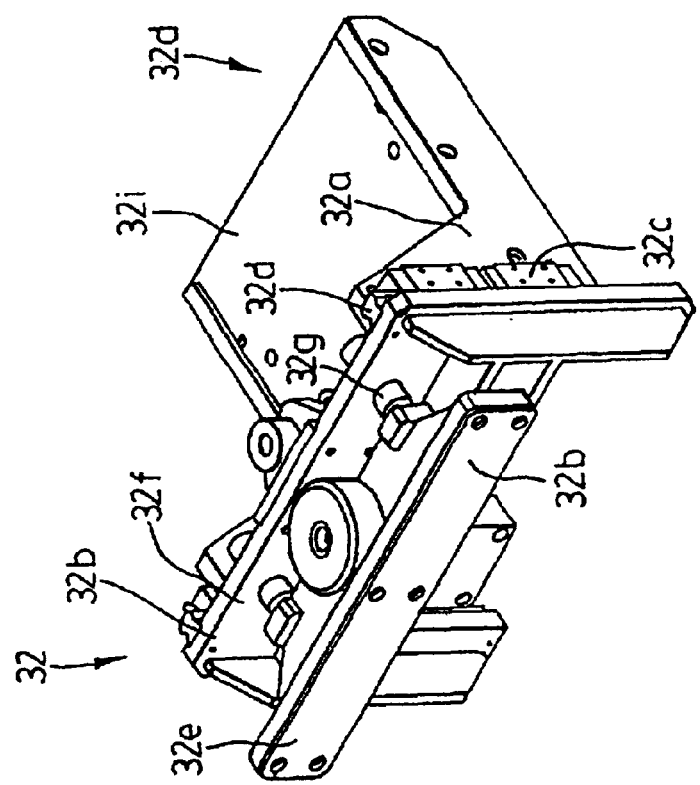
Figure 15B:
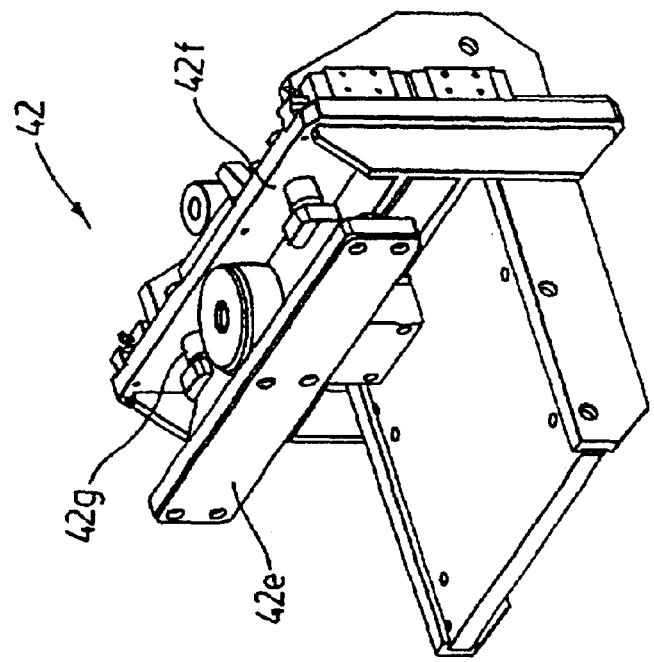
FIGS. 15a) and b) are perspective views of still another portion of the weld station of FIG. 9.
Figure 15A:
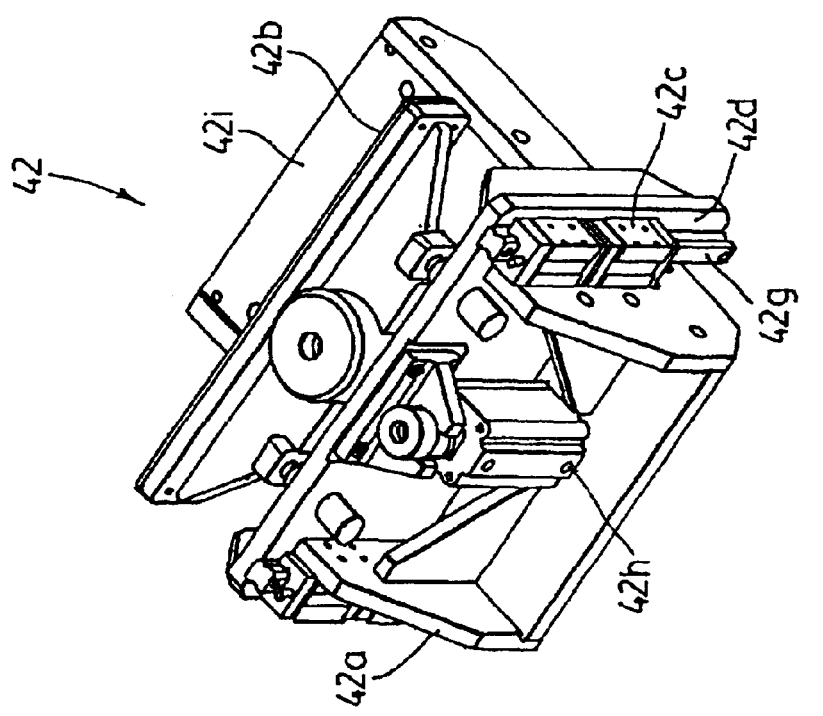

Referring first to FIGS. 3, 6 and then to FIGS. 9, 14*a* and 14*b*, a first displacement unit 30 is located near the downstream clamp assembly 14 to displace the edge 18*a* of the thick blank to its weld position in abutment with the locating member 26. The displacement unit has an abutment member 32 which is driven by a servo positioner 34. Referring to FIG. 14*a*, the abutment member includes a pair of upwardly directed flanges 32*a* and a blank abutment assembly 32*b* mounted on the flanges 32*a* by way of linear bearings 32*c* and tracks 32*d*. The blank abutment assembly includes an abutment pad 32*e* which is positioned adjacent a back plate 32*f* by bolts 32*g* (having a pair of spring loaded dampers. A first actuator 32*h* is operable to actuate the blank abutment assembly 32*b* between an operable position in the travel path and an inoperable position below the travel path. The first actuator 32*h* displaces the blank abutment assembly 32*b* relative to a base fixture 32*i*, the latter of which is mounted on the carriage 34*a* of the servo positioner 34, shown in FIG. 9. The servo positioner 34 is preferable for welding systems which produce many different parts. A welding system dedicated to one part, on the other hand, may alternatively make use of hydraulic, electro mechanical or pneumatic displacement units.

The upstream clamp assembly 12 is movable from the open position shown in FIG. 2 to an intermediate position as shown in FIG. 3. The intermediate position is selected to constrain the thin blank 20 to pass through the upstream clamp assembly 12 in a substantially coplanar relationship with the thick blank 18, so that the edge 20*a* of the thin blank can make edge-to-edge contact with the edge 18*a* of the thick blank 18, but not to overlap or ride over the thick blank 18.

The upstream clamp assembly 12 is also movable from the intermediate position to a closed clamped position to clamp the thin blank in its welded location, so that the welding process can proceed.

Referring to FIG. 11, first and second lateral positioning assemblies 36, 38 are provided, respectively, for positioning the first and second blanks relative to the travel path 16. In most cases, this lateral positioning function may involve centering the thick and thin blanks on the travel path 16 or, in other cases, adjusting the position of one blank such as the thick blank, relative to the other. This would be carried out, for example, when the one of the blanks, is narrower than, and has to be aligned with a predetermined end or section of, the other blank. Each blank has a pair of side edges (such as the side edges 18*b* of thick blank 18 in FIG. 11) and the lateral positioning assembly includes a pair of lateral abutment members 36*a*, 38*a*, each for engaging a corresponding side edge, and a lateral servo positioner 36*b*, 38*b* for positioning each of said lateral abutment members. Each of the lateral abutment members 36*a*, 38*a* includes an upwardly directed flange 36*d*, 38*d*, a number of stop members 36*e*, 38*e* mounted on the flange to abut the side edges of the blank and a number of ball transfer units 36*f*, 38*f* (the latter to support the underside of the blank).

Referring to FIGS. 4, 7, 9 and 15*a*), 15*b*), located near the upstream clamp assembly 12 is a second displacement unit 40 to displace the edge 12*a* of the thin blank toward its edge-to-edge abutment with the edge 18*a* of the thick blank at the weld location. As with the displacement unit 30, the displacement unit 40 similarly includes an abutment member 42 which is driven by a servo positioner 44. The abutment member 42 includes pair of upwardly directed flanges 42*a* and a blank abutment assembly 42*b* mounted on the flange, by way of linear bearings 42*c* and tracks 42*d*. The blank abutment assembly includes an abutment pad 42*e* which is positioned adjacent a back plate 42*f* by bolts 42*g*. A second actuator unit 42*h* is provided for actuating the blank abutment assembly 42*b* between an operable position in the travel path and an inoperable position below the travel path 16. The abutment member includes a base fixture 42*i* which is mounted on the carriage 44*a* of the servo positioner 44.

The upstream clamp assembly 12 is also moveable from the intermediate position to a closed clamped position to clamp the thin blank in its welded location, so that the welding process can proceed. It can be seen that the upper and lower clamp jaws 12*a*, 12*b* have adjacent inner clamp surfaces which are maintained in substantially parallel relation to one another in the open, intermediate and closed positions.

The general purpose computer may work within a network involving several general purpose computers, for example those sold under the trade names APPLE™ or IBM™, or clones thereof, which are programmed with operating systems known by the trade names WINDOWS™, LINUX™ or other well known or lesser known equivalent of these. The system involves pre-programmed software sing a number of possible languages or a custom designed version of a programming software sold under the trade name ACCESS™ or similar programming software. The computer network may be a wired local area network, or a wide area network such as the Internet, or a combination of the two, without or without added security, authentication protocols, or under "peer-to-peer" or " " or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH- and the like, or other well known Internet, wireless, satellite or cell packet protocols. The system may, alternatively, be executed on a single custom built computer which is dedicated to the function of the system alone.

Figure 16:
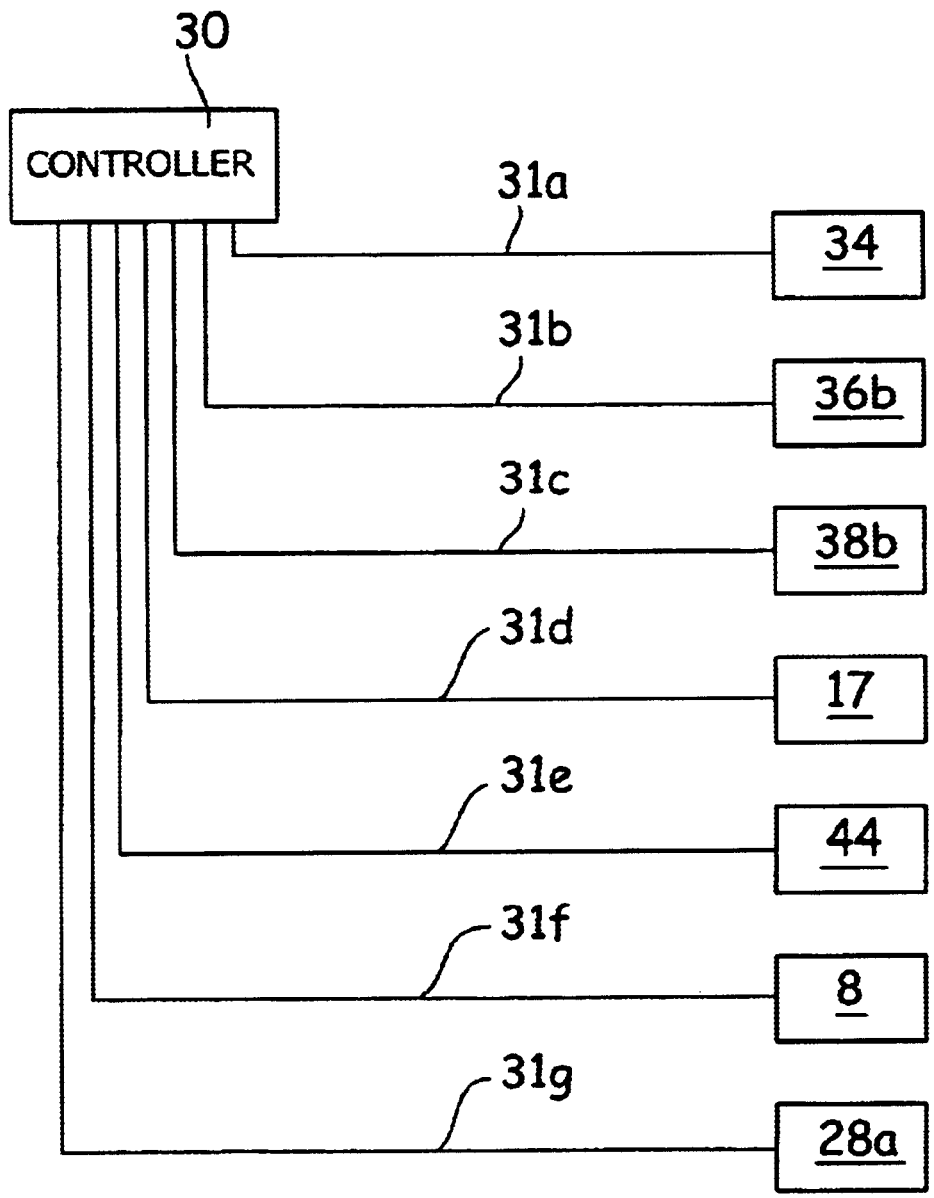
FIG. 16 is schematic view of a controller for use with the clamp assembly.
Figure 16A:
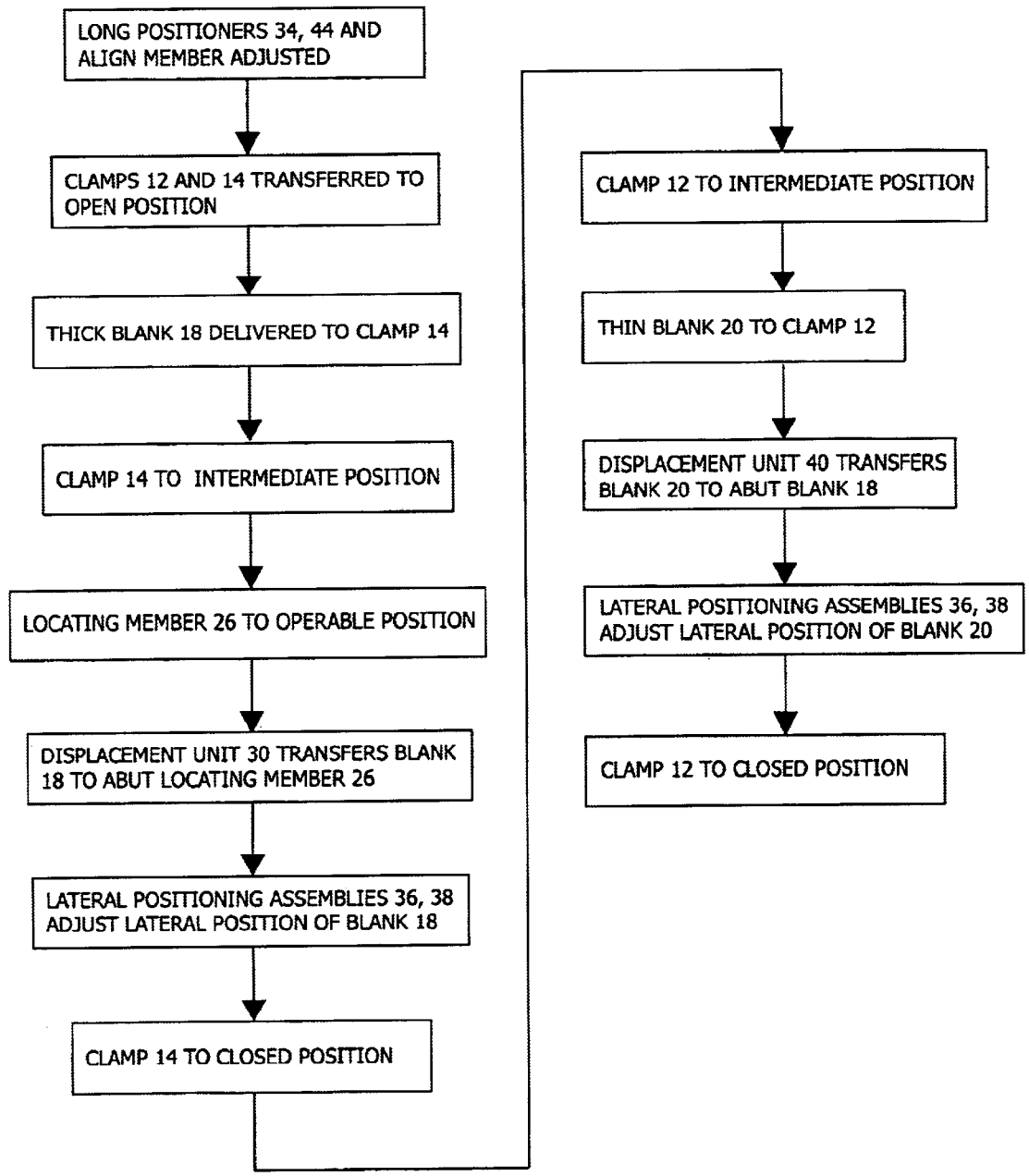
FIG. 16a is a schematic operational flow diagram of the clamp assembly.

Referring to FIG. 16*a*, the welding station operates as follows, it being understood that the steps discussed below are not necessary in any fixed order. Rather, some of the steps, particularly the timing of sequences provided by the controller, may be changed under different circumstances and depending on such factors as the speed of the line, the properties and shape of the thick and thin blanks, and the like.

First, a pair of blanks, in this case a thick blank and a thin blank, are prepared for the welding of a tailored blank. This may include, for example an upstream shearing device to provide a trailing edge on the thick blank and a leading edge on the thin blank with suitable dimensional tolerances. The thick blank is delivered to the conveyor 8 at its upstream end shown at "U" in FIG. 1 followed by the thin blank.

The controller then adjusts the longitudinal positioners 34 and 40 as well as the lateral positioners 36, 38 for each clamp assembly 12, 14 and the locating member 26, according to the dimensions of the blanks being welded. The controller then instructs the upstream and downstream clamp assemblies to be opened to the position as shown in FIG. 2. The controller also instructs the magnetic conveyor 8 to magnetize and thereby grip the blanks, and then to deliver the blanks to the clamping device 10.

The thick blank is delivered to its first location as shown in FIG. 3 at which time the controller instructs the locating member 26 to its operative position at the second location in the travel path, also as shown in FIG. 3. The controller also instructs the downstream clamp to be lowered to an intermediate position The controller then instructs the displacement unit 30 to move the thick blank, until its edge 18a abuts the locating member 26 at the third location. The lateral positioning assemblies 36 and 38 are then instructed by the controller to position the blank in its proper side-to-side orientation, that is essentially parallel to the path of travel of the laser beam during welding and essentially in a position to be in line with the approaching thin blank. The controller then instructs the downstream clamp assembly to move to its closed clamping position and the locating member 26 to retract to its inoperative position as shown in FIG. 4.

The controller then instructs the upstream clamp assembly to move to its intermediate position, as shown in FIG. 4.

The timing of the retraction of the locating member 26 is set to occur just before the thin blank arrives in the upstream clamp assembly.

The controller then instructs the displacement unit 40 to move the thin blank until its edge 12a comes to the fourth location in edge-to-edge contact with the trailing edge 18a. The lateral positioning assemblies and are then instructed by the controller to position the thin blank in its proper side to side orientation, that is essentially parallel to the path of travel of the laser beam during welding and essentially in an in line position with the thick blank. The controller then instructs the upstream clamp assembly to move to its closed clamping position to clamp the thin blank in the fourth location.

Thus, the clearance of the upstream clamp assembly in its intermediate position is selected to permit the thin blank to travel through the clamp at a faster speed to bring collision. However, the intermediate position is such that the thin blank is unable to be deflected to ride over the trailing edge of the thick blank.

The controller then instructs the laser welding unit to initiate the weld by delivering the laser beam 28 to the weld location.

While the above device is arranged to clamp blanks of unequal thickness to form a tailored blank, it will be understood that the device may also be configured to weld blanks of substantially equal thickness. The thick blank, in the above arrangement, need not necessarily be delivered first to the downstream clamp assembly in all possible situations, but instead may in some cases follow the thin blank. Thus, the clearance in the upstream clamp may not be smaller in the intermediate position than the open position in all cases.

Referring now to FIGS. 8, 8a, and 17 to 24 the welding line has a shearing station 50 upstream of the welding station 9. Details of the shearing station 50 can be found in the Honda '469 patent. The welding plant also includes a conveyor system 60 for delivering, successively, two groups of blanks of different dimensions along a travel path (or two travel paths) to the shearing station 50 and for orienting each blank to arrive at the station in a precisely controlled orientation.

Figure 8:
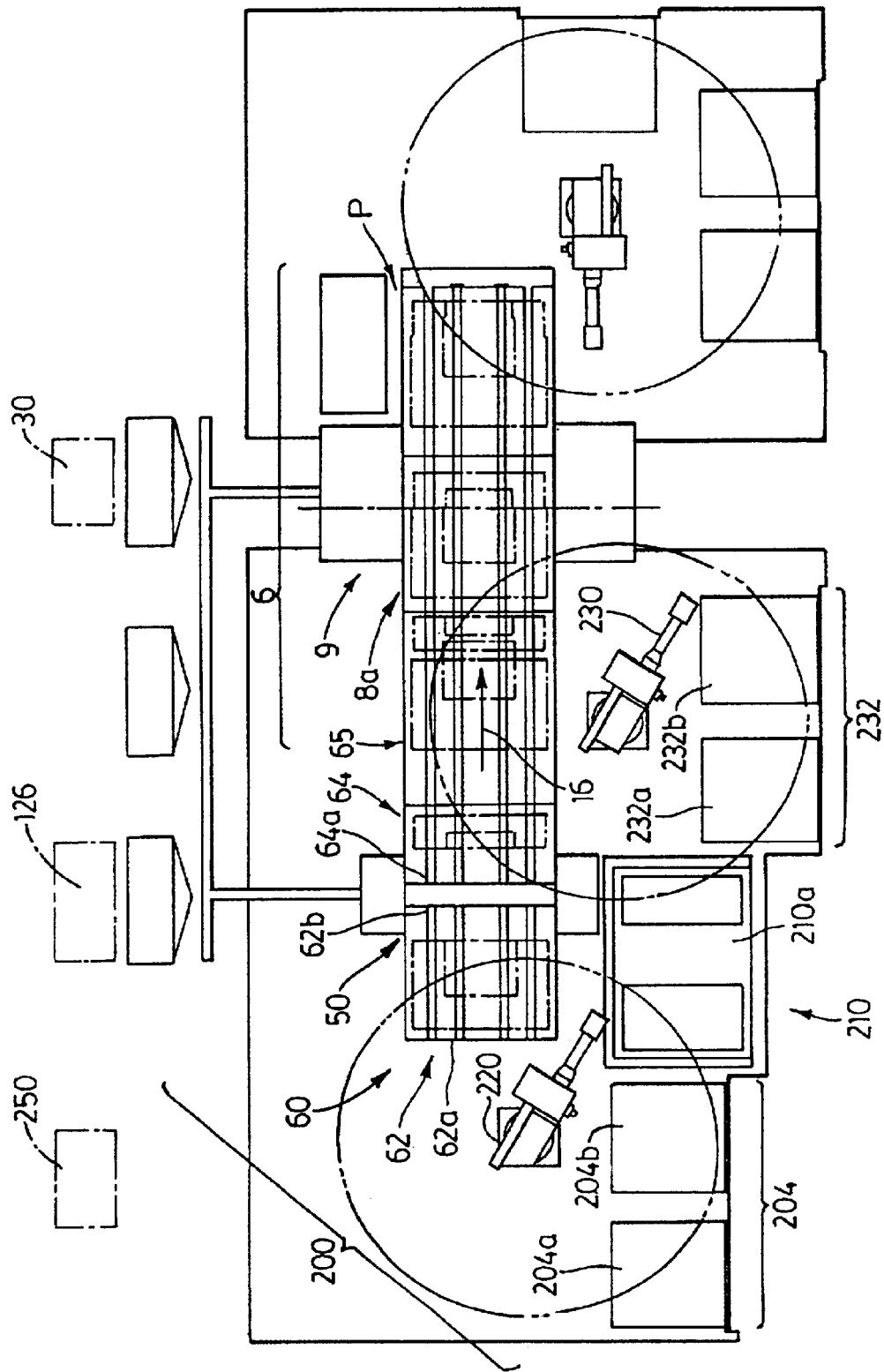
FIG. 8 is a schematic plan view of a welding plant implementing the welding line of FIG. 1.
Figure 8A:
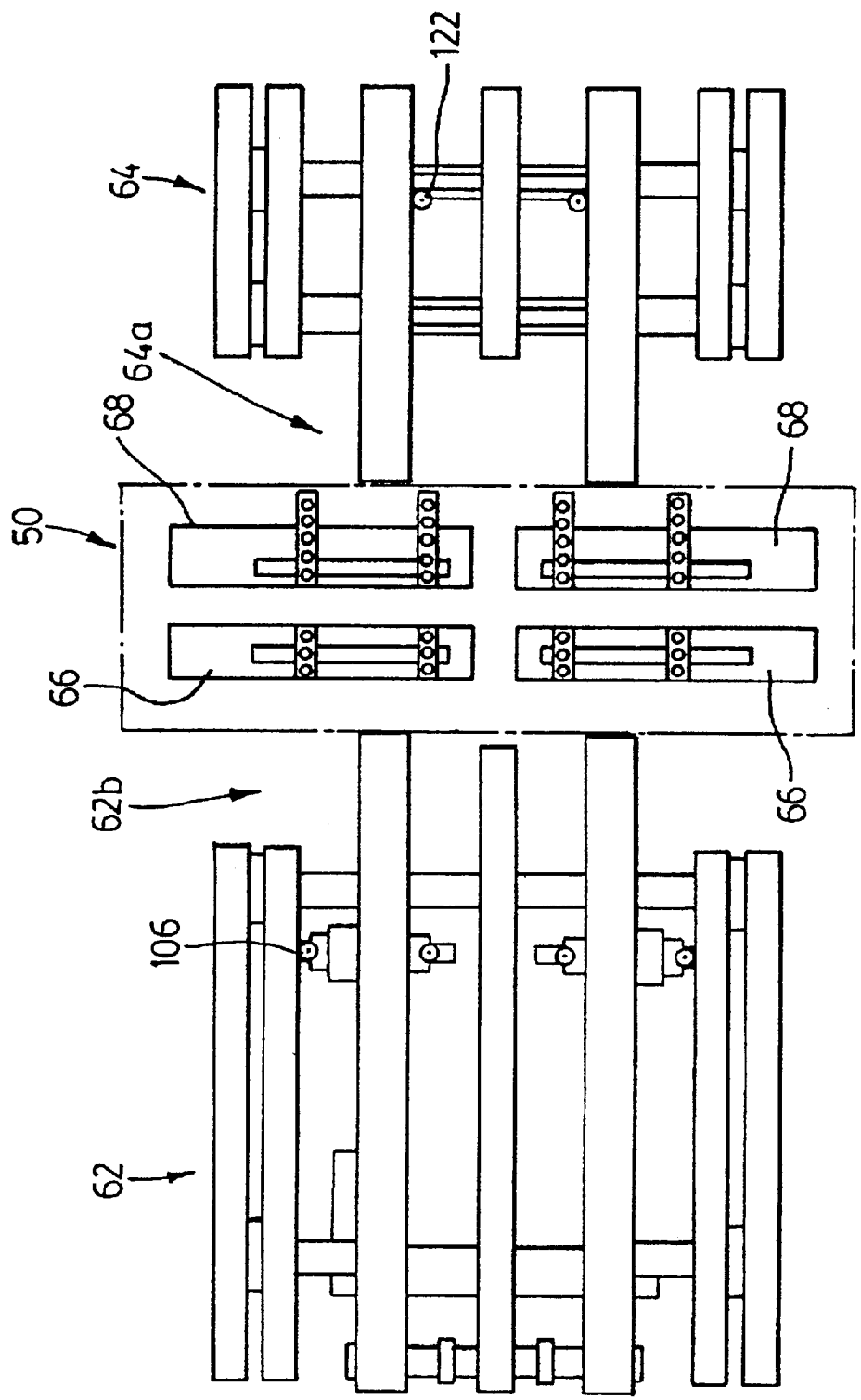
FIG. 8a is a schematic plan of shearing station of the portion of the plant of FIG. 8.

The conveyor system 60 includes continuous magnetic conveyors 62 and 64 on either side of the shearing station 50 and a conveyor 65 downstream of conveyor 64. Conveyor 8 is downstream of conveyor 65 and presents the welded tailored blank to a pick up station 'P', the details of which can be seen in the Honda '469 patent. Conveyor 62 has an upstream end 62a where it receives thin blanks as will be described and a downstream end 62b where the thin blanks are delivered to the shearing station 50. As will be described, conveyor 64 has a first end 64a, as shown in FIG. 8. Both conveyors 62 and 64 operate in two different directions in different operating phases as will be described. In one phase, for example, the blanks which are deposited on the conveyor are then delivered one-by-one, to the shearing station 50. In another phase, the thick and thin blades are both transferred by the conveyor, together (or in pairs) from the first end 64a to the welding station 9. Each conveyor delivers a blank to a respective side of the shearing station. The conveyor 62 delivers, in this case, the thin blank to the upstream side of the shearing station (that is the left side as viewed in FIG. 8) while the conveyor 64 delivers the thick blank to the downstream side of the shearing station 50 (that is the right side as viewed in FIG. 8).

A pair of lateral positioning arms 66, are located adjacent the downstream end 62b of the conveyor 62 to align the thin blank laterally, relative to the shearing station. Similarly, a pair of lateral positioning arms 68 are also located adjacent the upstream end 64a of the conveyor 64 to align the thick blank.

Figure 21:
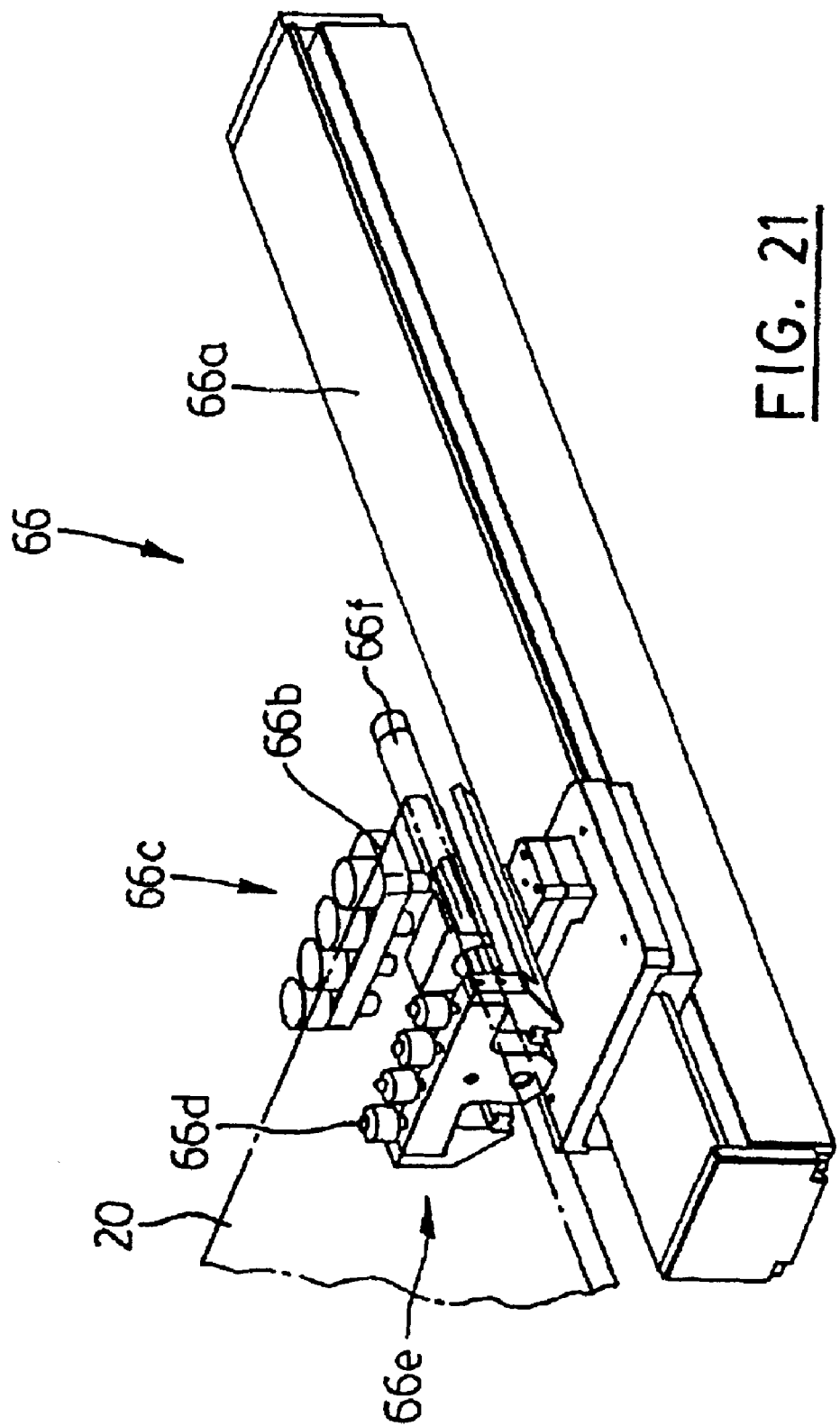
Figure 22:
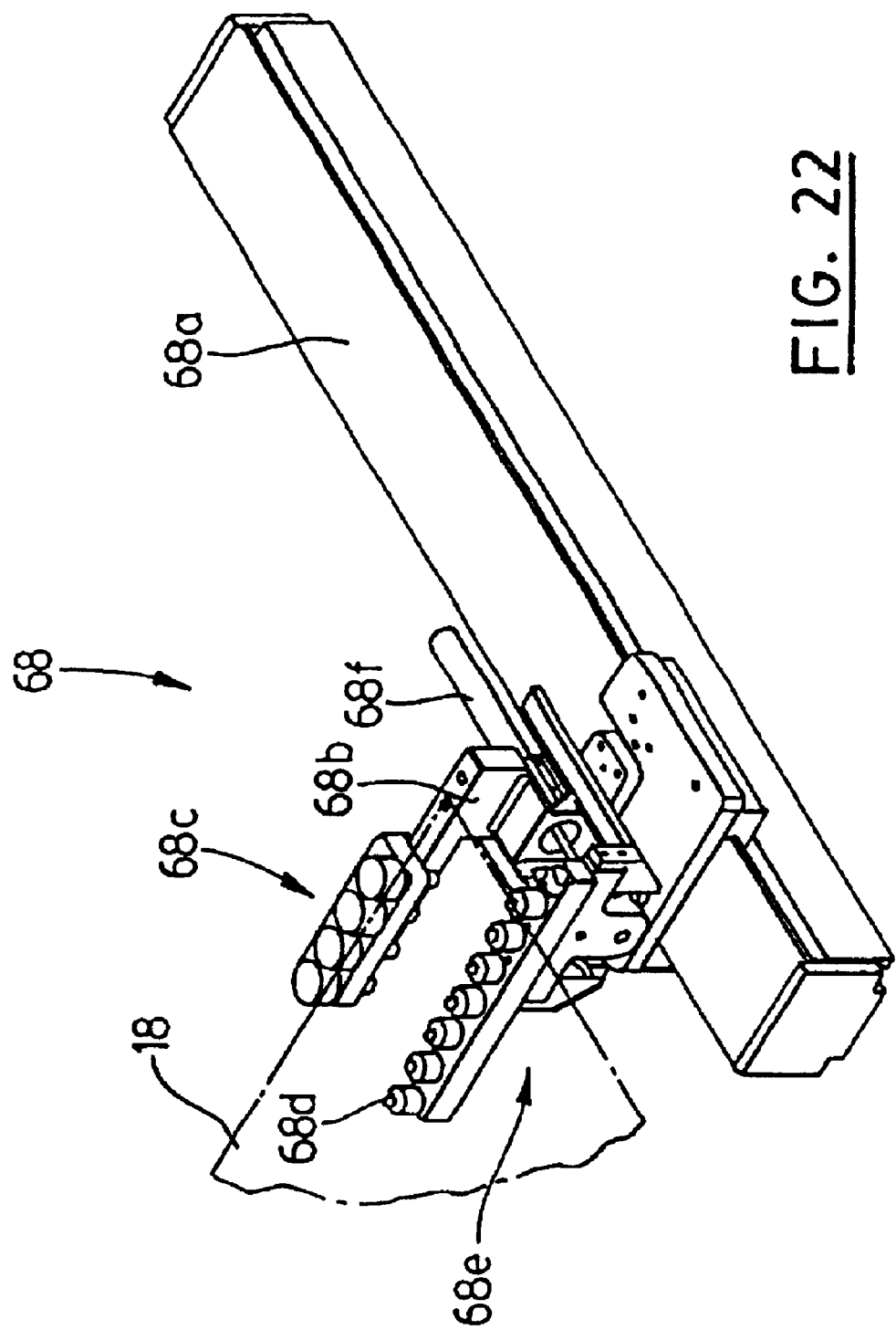

Each of the lateral positioning arms 66, 68 engages and positions one side edge of a corresponding thin blank or thick blank and is incrementally driven by servo positioners 66a, 68a respectively (as seen in FIGS. 21, 22). Each of the lateral positioning arms respectively includes an upwardly directed frame member 66b, 68b and a plurality of stop members 66c, 68c mounted on the frame member. Located adjacent the stop members are a number of ball transfer units 66d, 68d. The transfer units mounted on a frame 66e, 68e and are movable relative to the frame member 66b, 68b to adjust the point of support of the blanks, depending on their size, under the action of actuators 66f, 68f. Blanks 18 and 20 are shown in FIGS. 22 and 21, respectively, each in an engaged position with the lateral positioning arm.

The servo positioners 66a, 66b are movable between an inoperative position and an operative blank-engaged position, wherein the blank-engaged position is selected to locate each blank of the first group in a precisely controlled first orientation and each blank of the second group in a precisely controlled second orientation. In other words, in the operative position, the stop members are spaced from the side edges of the blank, while the blank is travelling over and is supported on its underside by the ball transfer units 66d, 68d.

Referring to FIGS. 17 to 20b, a pair of longitudinal positioning assemblies 100 and 101 are provided for positioning either a leading edge or a trailing edge on the two blanks.

Figure 17:
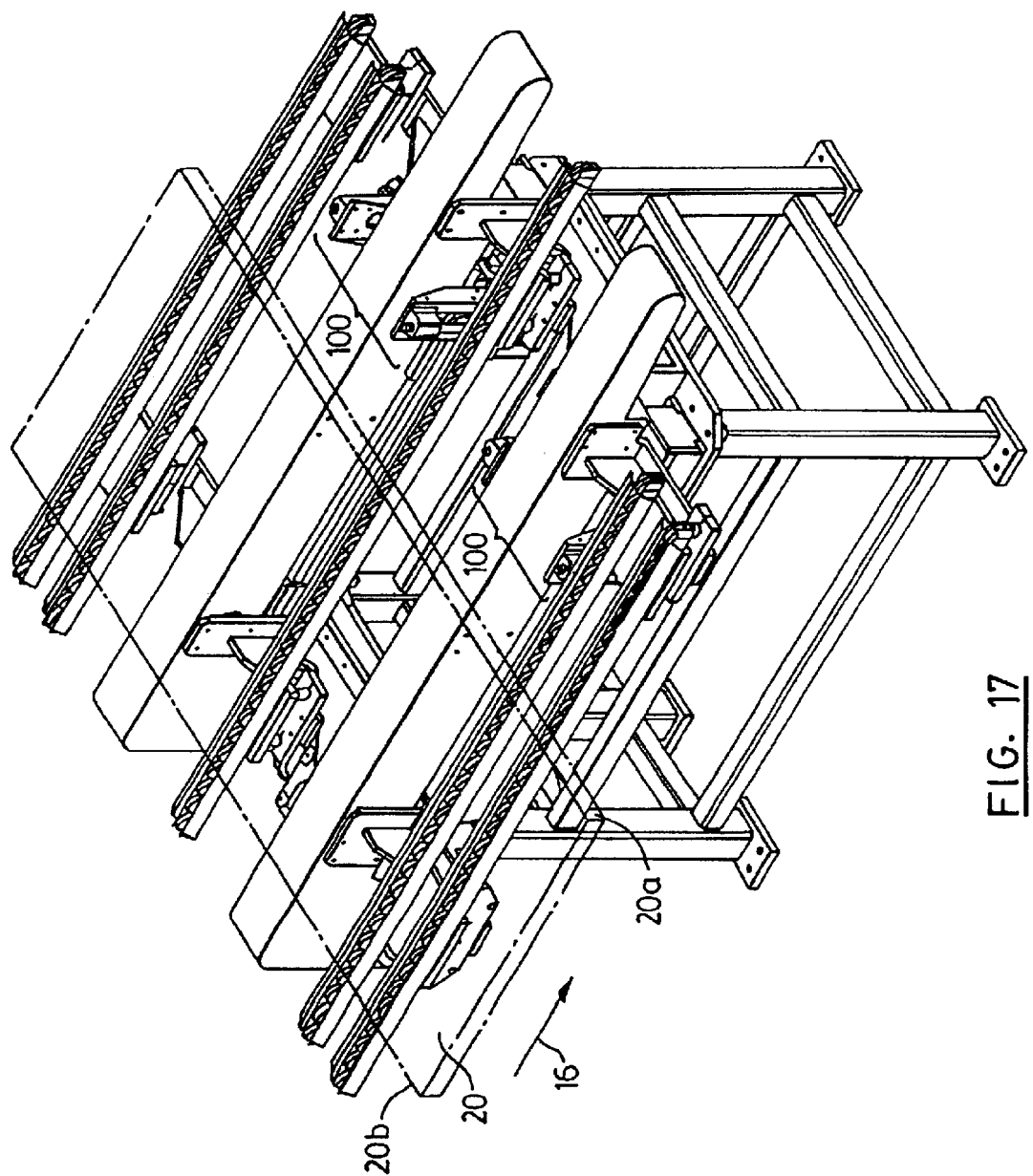
FIG. 17 is a perspective view of a conveyor portion of the weld station of FIG. 9.
Figure 18:
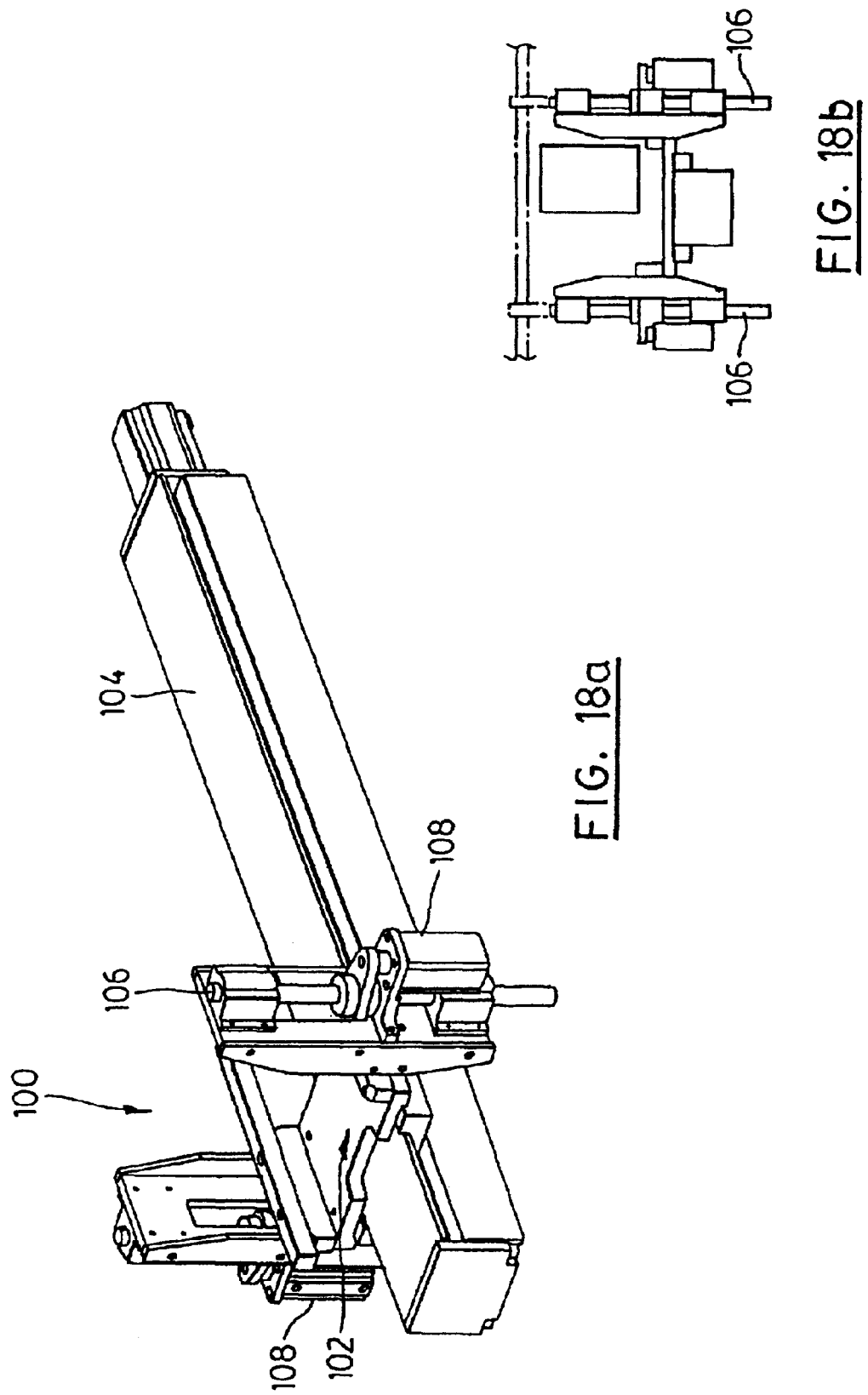
FIGS. 18a) and b) are perspective and end views of one part of the conveyor portion of FIG. 17.
Figure 19:
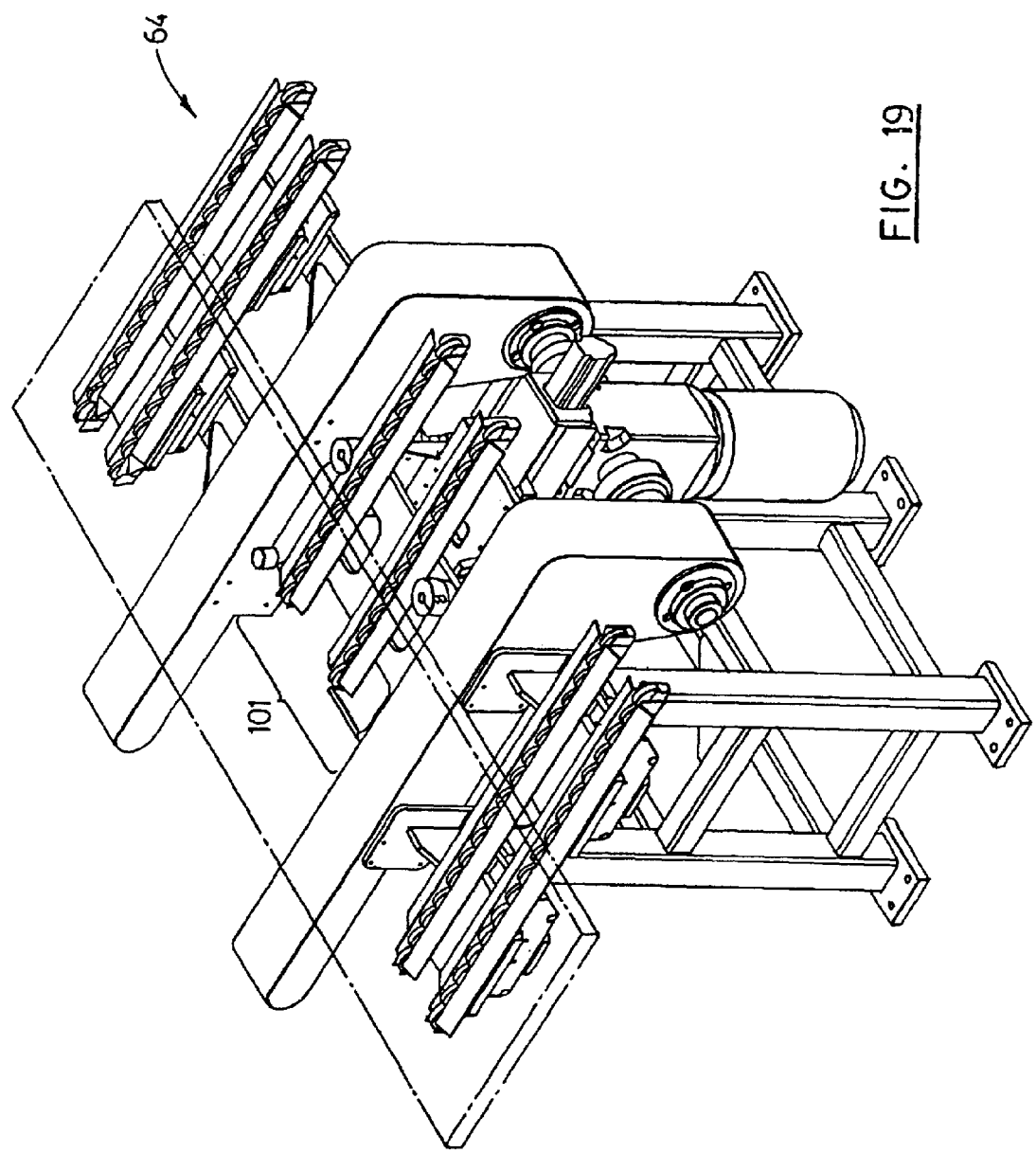
FIG. 19 is a perspective view of another conveyor portion of the weld station of FIG. 9.

Referring to FIG. 18a, the longitudinal positioning assembly 100 has a carriage 102 mounted for travel along the travel path by way of a servo positioner 104, two setting pins 106 and two drive units 108 for driving the setting pins between an operative position interrupting the travel path and an inoperable position below the travel path (the former position shown in dashed lines and the latter position shown in solid lines, both in FIG. 18b). The setting pins 106 are located at a position in the travel path to engage the trailing edge 20b of the thin blank (as seen in FIG. 17).

Figure 20B:
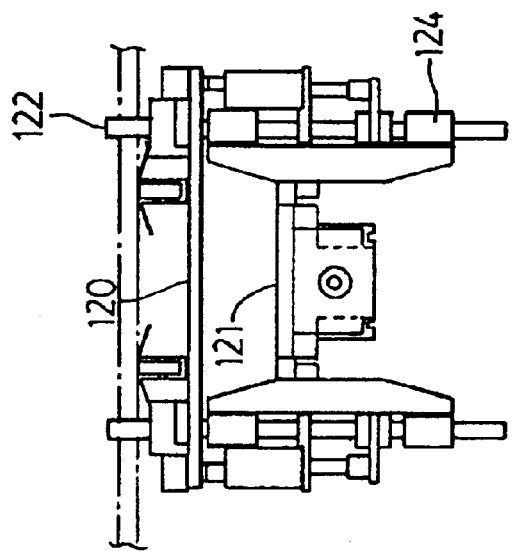
FIGS. 20a) and b) are perspective and end views of one part of the conveyor portion of FIG. 19.
Figure 20A:
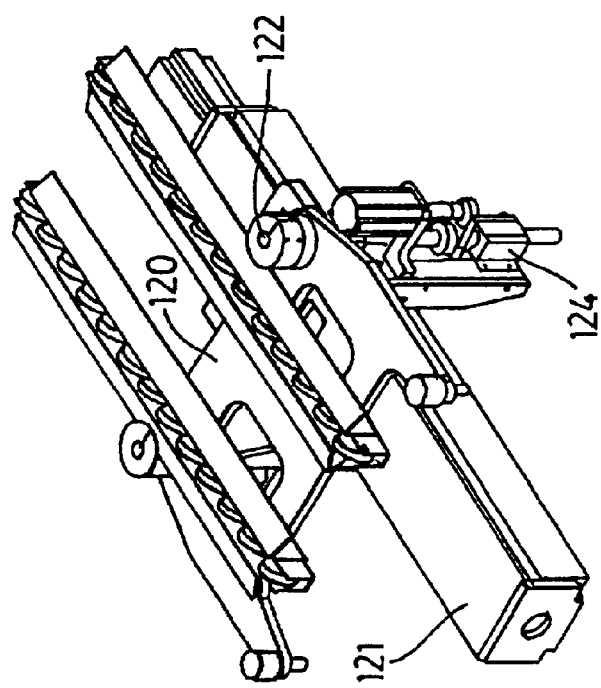

Referring to FIG. 20a, the longitudinal positioning assembly 101 similarly has a carriage 120 mounted for travel along the travel path by way of a servo positioner 121. Two setting pins 122, driven by two drive units 124, are movable between an operative position interrupting the travel path (as shown in dashed lines in FIG. 20b) and an inoperable position below the travel path (as shown in solid lines in FIG. 20b). The setting pins are located at a position in the travel path to engage, in this case, the leading edge of the blank.

In this case, the servo positioners 104, 121 are used to adjust the otherwise longitudinally stationary positions of the setting pins 106, 122 relative to the travel path during processing of the blanks. The servo positioners provide the benefit that the shearing station can, very efficiently, be adjusted to accommodate a part change, without the need for manual adjustments.

Figure 23:
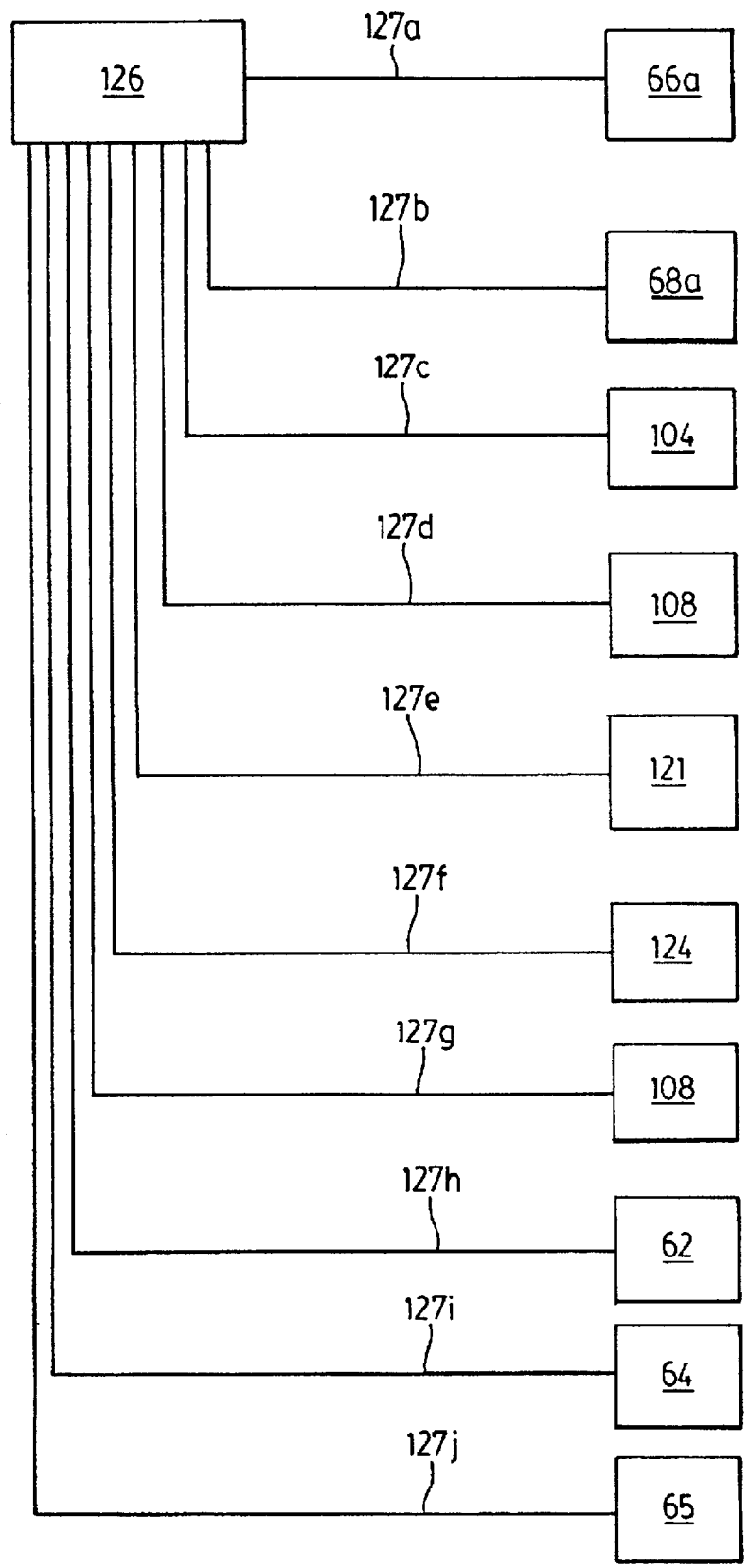
FIG. 23 is a schematic view of a controller for use with shearing station in the plant of FIG. 8.

Referring to FIG. 23, a servo controller 126 is also provided for controlling the servo positioners 66a, 68a, 104, and 121, as well as the drive units 108 and 124 and the conveyors 62, 64 and 65, by way of conductors 127a to 127j. The controller 126 may of the type described above for controller 30 and is functionally integrated therewith.

Figure 24:
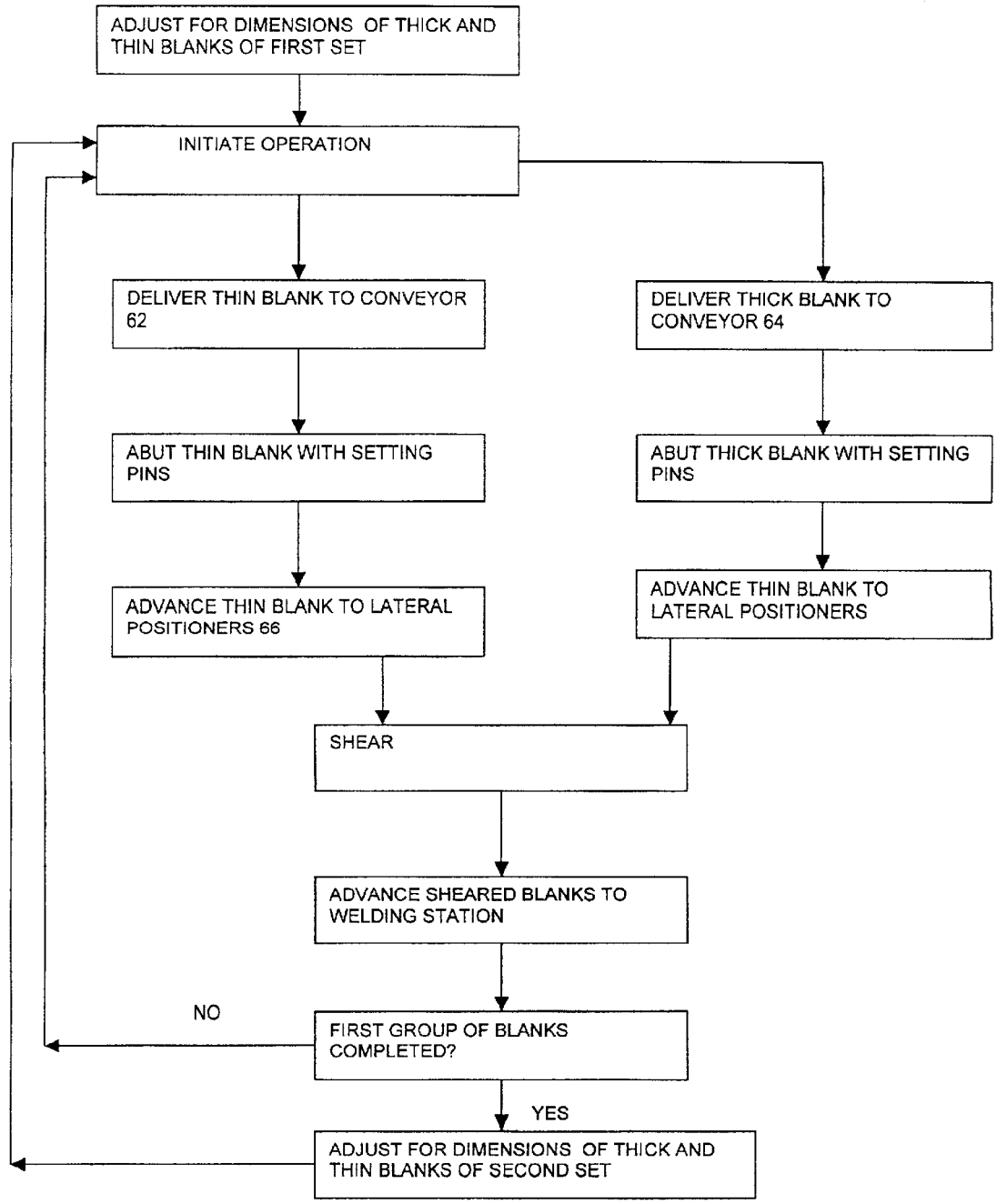
FIG. 24 is a schematic operational flow diagram of the shearing station.

Referring now to the flow diagram of FIG. 24, the conveyor system 60 is used as follows. The first group of blanks in this specific example is a set of thin blanks to arrive on the conveyor 62 and a set of thick blanks to arrive on the conveyor 64. The thick and thin blanks of the first groups are matched with one another according to some predetermined parameter. For example, they might both be used in the fabrication of a tailored blank for a door component. In this case, data is entered into the controller to define the thin and thick blanks of the first group. The controller 126 then actuates the servo positioners 104, 121 to adjust the position of the setting pins 106, 122 according to the dimensions of the thin and thick blanks, in this case. Once the position has been set, the setting pins 106, 122 will remain stationary along the travel path during the processing of the first group of blanks, but will shuttle vertically between an operative position in the travel path and an inoperative position below the travel path 16. Similarly, the controller actuates the servo positioners 66a, 68a according to the dimensions of the blanks in this case. The servo positioners will have a memory position corresponding to the width of the respective blocks and the controller is operable to shuttle the stop members 66c, 68c between an open position and the memory position.

After one thin blank is delivered to the conveyor 62, the controller instructs the drive units 108 to actuate the pins 106 to their operative position in the travel path. The conveyor travels in reverse (that is opposite to the direction of travel path 16) to displace the thin blank upstream to bring the trailing edge of the blank against the pins 106. The controller then instructs the magnetic conveyor to reverse direction (again) and deliver the thin blank into the region of the lateral positioners 66, which are then instructed by the controller to engage the side edges of the blank and align it laterally relative to the shearing station.

Similarly, after one thick blank is delivered to the conveyor 64, the controller instructs the drive units 124 to actuate the pins 122 to their operative position in the travel path. The conveyor then displaces the thick blank downstream to bring the leading edge of the blank against the pins 122. The controller then instructs the magnetic conveyor to reverse its direction (that is opposite to the direction of travel path 16) and deliver the thick blank into the region of the lateral positioners, which are instructed by the controller to engage the side edges of the blank and align it laterally relative to the shearing station. The shearing station then shears the adjacent ends of the thin and thick blanks simultaneously (as disclosed in the Honda '469 patent). After shearing, the thick and think blanks are carried by conveyor 64 to the welding station. Meanwhile, the shearing operation is repeated for another pair of blanks from the first group until the thin and thick blanks of the first group have been processed.

The conveyor system 60 may then be prepared for a second group of blanks. Again, using the same specific example, the second group is a set of thin blanks to arrive on the conveyor 62 and a set of thick blanks to arrive on the conveyor 64. The thick and thin blanks of the second group are matched with one another according to some predetermined parameter, such as a truck hood and is thus different from the first group. In this case, the data is entered into the controller to define the thin and thick blanks of the second group. As a result, the controller and the servo positioners are able to adjust automatically for the different dimensions of the second group without the need for manual changes, such as the removal of one set of dedicated jigs on the lateral positioners for the first group and the installation of a second group of jigs for the second group.

Thus, the controller 126 is operative in:
  a first phase to adjust the operative and inoperative positions according to the dimensions of the blanks in the first group,
  a second phase to shuttle the first and second servo positioners between their inoperative and operative positions as the blanks in the first group are being processed;
  a third phase to adjust the operative and inoperative positions according to the dimensions of the blanks in the second group; and
  a fourth phase to shuttle the first and second servo positioners between their inoperative and operative positions as the blanks in the second group are processed.

Referring to FIGS. 8 and FIGS. 25 to 28, the welding line is also equipped with a delivery station 200 for delivering blanks to the conveyor 62, in one case upstream of the shearing station 50 and, in another case, downstream thereof (relative to the direction of the travel path 16). The delivery system includes an input location 204 for providing a plurality of blanks to be processed. In this case, the input location has a pair of bulk blank carrying hoppers 204a, 204b. The hoppers may also be provided with blank fanning units as are known to separate, at least partially, the uppermost blank from the remaining stack of blanks. The conveyor 60 has an upstream end 62a near the input location and a downstream end 62b at the shearing station. A reject location for receiving rejected blanks is provided at 210 and, in this case, includes a reject receiving bin 210a.

A robotic arm is provided at 220 and is operable to transfer thin blanks from the input location 204 to the upstream end 60a of the conveyor. A similar robotic arm is provided at 230 and is equipped to handle the thick blanks. In this case a second input location is provided at 232 with similar hoppers 232a and 232b. In this case, the robotic arm 230 transfers thick blanks to the conveyor 64 to deliver them to the sheering station at 50.

Figure 25:
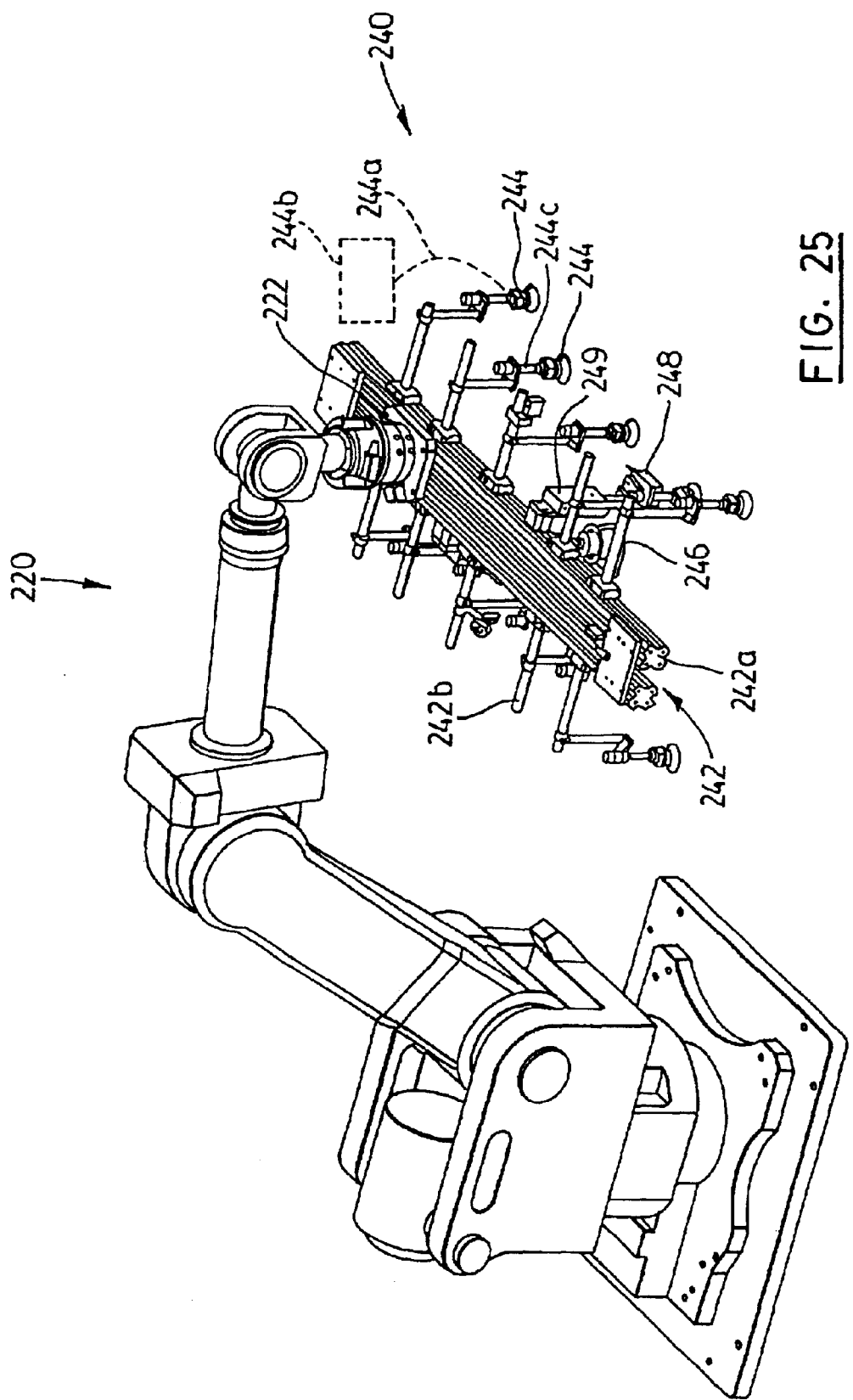
FIGS. 25 and 26 are perspective views of robot stations in a delivery station portion of the welding plant of FIG. 9.
Figure 26:
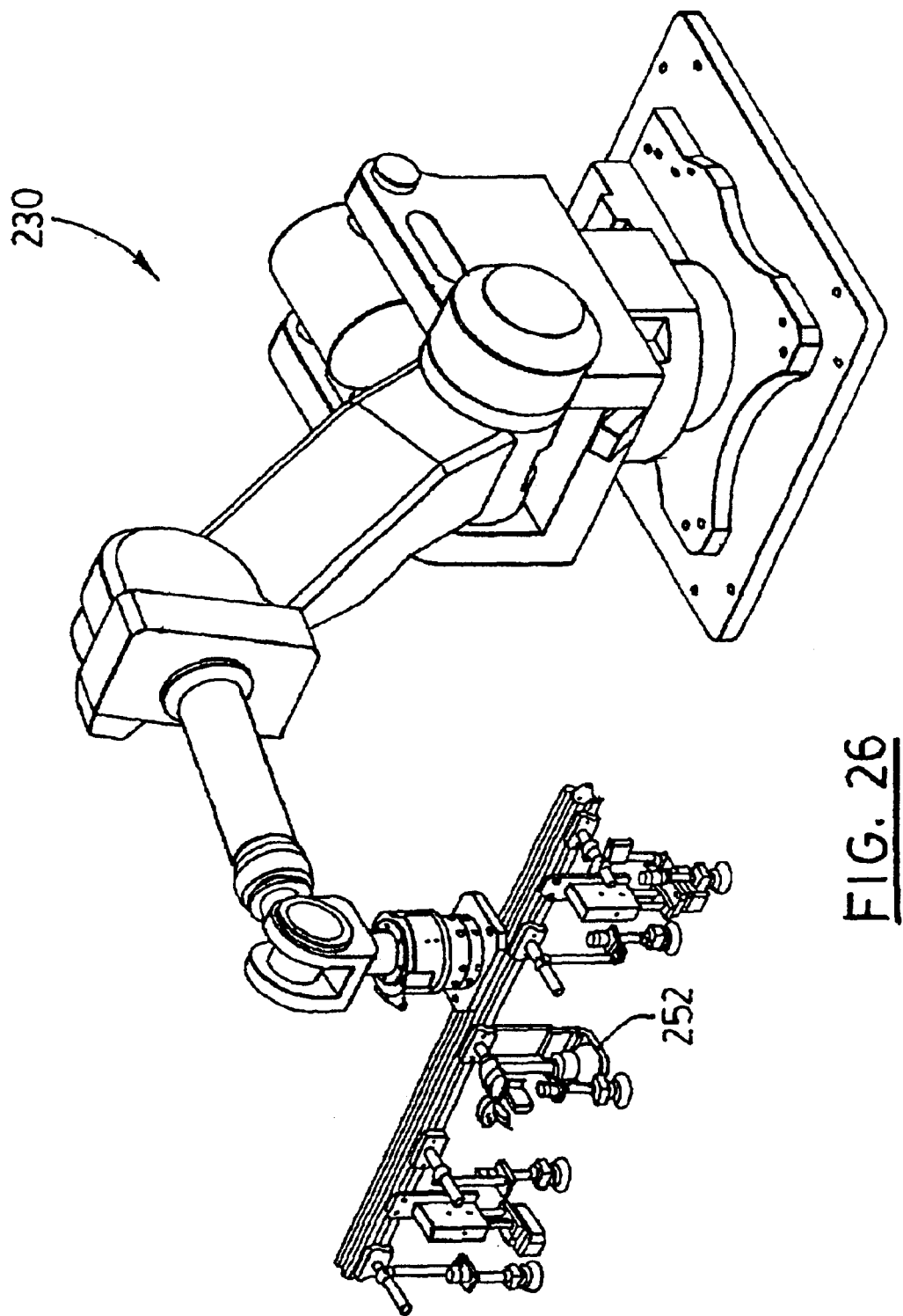
Figure 27:
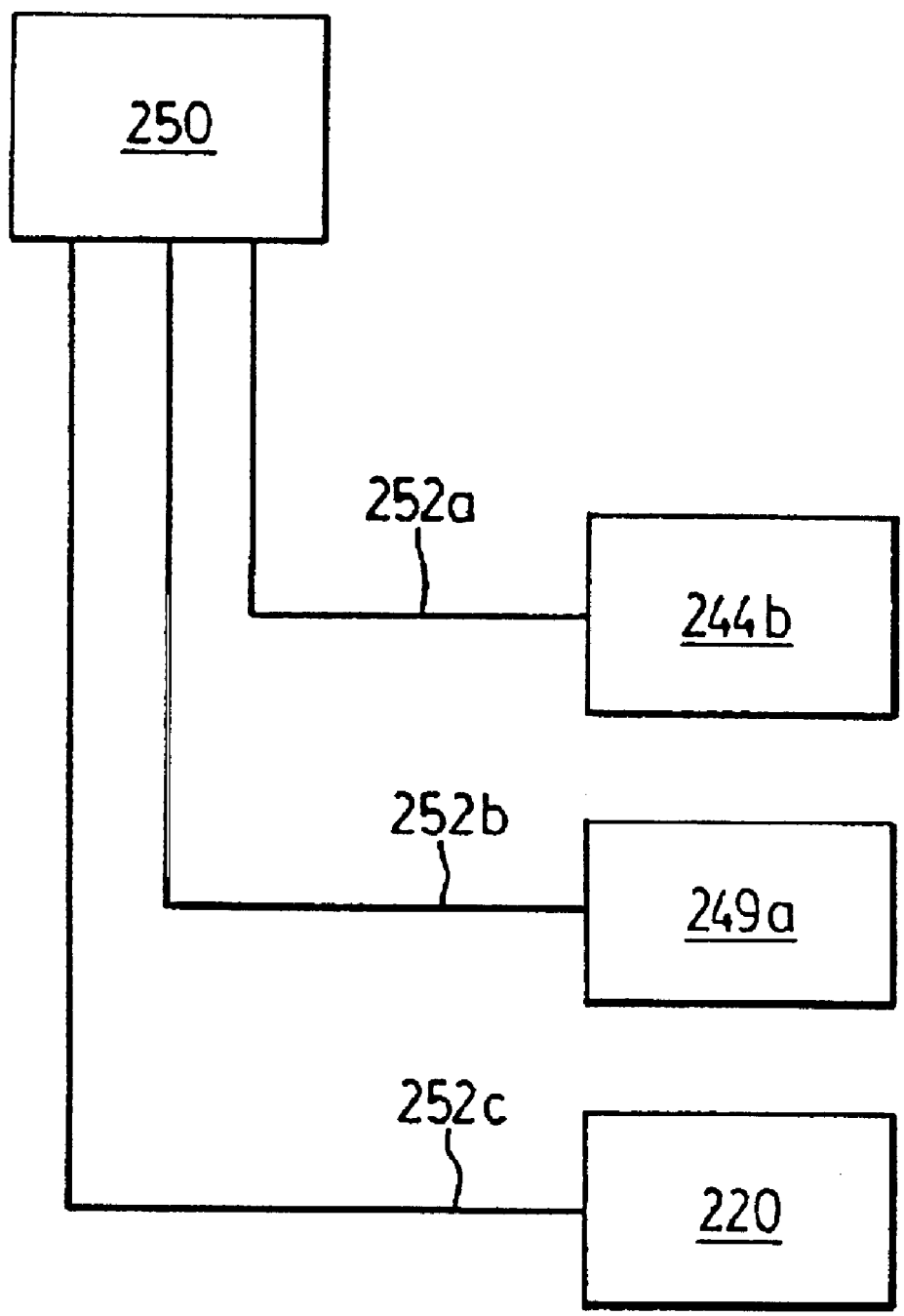
FIG. 27 is schematic view of a controller for use with delivery station of FIG. 9.

Referring to FIG. 25, the robot arm 220 has a coupling end 222 which carries carrying a blank pick up assembly 240 which itself includes a frame arrangement 242 formed by a pair of elongate frame members 242a and a number of cross members 242b. The latte cross members support a plurality of engaging members in the form of suction devices 244, which are positioned to the pickup assembly for establishing a suction connection between the blank and the pickup assembly, in order that the suction devices can, collectively, deliver sufficient upward force to 'stick' the blank temporarily against the frame arrangement so that the pickup assembly can lift the blank. The suction devices may be replaced by other pickup devices, such as magnets and the like. In this case, the suction devices are supplied by a number of suction lines, one of which is shown in dashed lines at 244a, operated by valves, one of which is shown at 244b. Each of the suction devices is provided on a spring loaded arm 244c which permits the pick up assembly to establish initial contact between the suction devices and the uppermost blank and then to press the suction device further under the action of each spring loaded arm 244c while the vacuum is being established each suction device.

The cross members also carry one or more sensing means in the form of magnetic flux sensors (in this case only one such sensor is shown at 246) which are operable to sense changes in magnetic flux. These changes will vary depending on whether one or more than one blanks is adjacent the sensor. The sensor 246 is positioned to be immediately adjacent the blank when the robotic arm lifts the blank from the input location. The sensor is operable, after the blank has been lifted a short distance off the stack of blanks (such as for example in the order of about 1 to about 5 cm) to sense a normal condition and a reject condition. An example of the sensor 246 is available from SYRON.

The normal condition occurs when the sensor senses the presence of only a single blank at the pickup assembly. The robot arm is operable, in the normal condition, to transfer the sensed single blank to the conveyor 62.

The reject condition occurs when the sensor senses the presence of two or more blanks at the pickup assembly. In this case, the pickup assembly is further provided with at least one supplemental engagement means, in this case a plurality of magnets, one of which is shown at 248. The magnet 248 is operable in the reject condition to deliver a magnetic attraction force to the two or more blanks operable to engage the two or more blanks with sufficient strength to permit the robot arm to pick up the two or more blanks. In this case, the magnet 248 is located on a spring loaded arm 249. The spring loaded arm 249 thus brings the magnet into contact with the uppermost blank, so that, in the case of two or more blanks being detected in the reject condition, the magnet will anchor them against the pickup assembly. The magnet 248 may be a rare earth magnet, for example. Alternatively, the magnets may be electromagnetic so that they can be activated only when needed. In addition, the magnets may be displaced from an inoperative position to an operative position which is operable in the reject condition to displace the magnet from an inoperative position in which the magnet is spaced a sufficient distance from the blank so as to exert substantially no attraction thereon to an operative position sufficiently close to the blank so as to exert a magnet attraction force thereon.

The delivery station 200 is controlled by a controller 250 which is of the type described for controller 30 and is functionally integrated with the controllers 126 and 30 as described above. The controller 250 controls the valves 244a, the solenoid actuator 249 driving the magnet 248 and, generally, the various functions of the robot 220 by way of communication channels 252a to 252c. The controller also controls the equivalent components of the robot 230.

Figure 28:
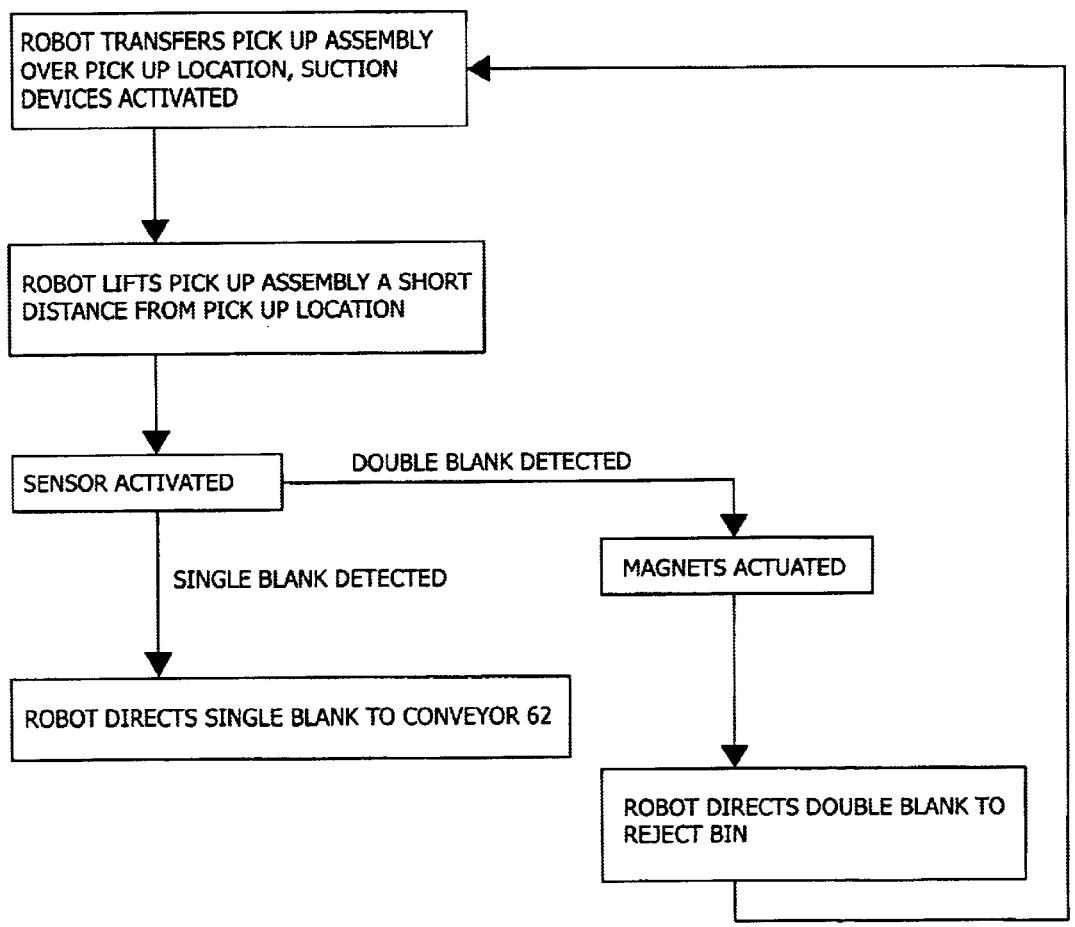
FIG. 28 is a schematic operational flow diagram of the shearing station.

Referring to FIG. 28, the delivery system thus operates as follows. The robotic arm is directed to the input location 204 and the pickup assembly is lowered until the suction devices 244 and the magnet 248 contact the uppermost blank on the stack of one of the blank carrying hoppers. The suction devices are activated and a suction force is delivered to the uppermost blank. The robot then lifts the pickup assembly, thereby causing the uppermost blank to be lifted off the stack. After the robot has lifted the blank a short distance above the stack, the, sensor is activated. If it detects only a single blank, then the robot is directed to transfer the single blank to the upstream end 62a of the conveyor 62.

On the other hand, if the sensor detects more than one blank, the magnets 248 are in contact with the uppermost blank and holds the multiple blanks in a bundle against the pickup assembly and the robot is then directed to deliver the bundle to the reject receiving bin where the suction devices are then inactivated to release the bundle from the pick up assembly. In this case, the magnetic force is insufficient to overcome the vacuum decoupling between the suction devices and the uppermost blank. As a result, both blanks are released.

The robot arm 232 operates in the same manner by way of its suction devices 250, sensor 252 and magnets 254 and, in this example, delivers the bundles of thick blanks to the same reject receiving bin.

Thus, the robot is, in this instance, capable of monitoring the presence of a double blank during the initial moments immediately after the positive engagement of the uppermost blank with the pick up assembly and after the instant that the uppermost blank is separated from the remaining blanks at the input location, for example in the order of about 0.1 to 0.5 seconds, following initial displacement of the uppermost blank. Alternatively, the sensing function may be triggered by a spacing limit between the engaged blank and the topmost blank remaining at the input location. This distance may be in the order of about 1 to about 5 cm, though different spacings may be equally applicable depending on the orientation of the input location the conveyor, the reject location and, of course, the robot arm itself.

The method of detecting a double blank is beneficial because the detection function can occur during transfer and the robot can be diverted to the reject location instead of the conveyor when a double blank is detected. The method provides the advantage of combining the two functions of detection and transfer into one continuous operation. The shearing station, in this particular example, will only be interrupted for a relatively short time while the reject function proceeds and another single blank is detected.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A welding system, comprising:
   travel path to carry a first blank and a second blank in downstream direction, the first blank having a first weld edge and the second blank having a second weld edge, for a weld seam to be formed along the first and second weld edges;
   an upstream clamp assembly and a downstream clamp assembly positioned on the travel path;
   each of the upstream and downstream clamp assemblies being movable to an open position to allow the first blank to pass through the upstream clamp assembly to a first location within the downstream clamp assembly;

a welding source directed at a weld location on the travel path between the upstream and downstream clamp assemblies;

a least one locating means operable in one phase to interrupt the travel path and to locate the first weld edge adjacent the weld location;

first displacement means to reverse the direction of the first blank and to displace the first weld edge in an upstream direction against the locating means;

the downstream clamp assembly being movable from the open position to a closed clamped position to clamp the first blank with the first weld edge adjacent the weld location;

the locating means being operable to be withdrawn from the travel path;

the upstream clamp assembly having an upper clamp portion defining an upper clamp surface and a lower clamp portion defining a lower clamp surface, wherein the upper and lower clam surfaces are adjacent one another, the upper clamp portion being movable relative to the lower clamp portion in a direction transverse to the travel path from the open position to an intermediate position, the intermediate position being selected by a predetermined spacing between the adjacent clamp surfaces to guide the second blank to pass through the upstream clamp assembly in a substantially coplanar relationship with the first blank so that the second weld edge makes contact with, but not past, the first weld edge;

second displacement means to displace the second blank along the travel path to a location adjacent the weld location here the second weld edge abuts the first weld edge;

the upstream clamp assembly being movable from the intermediate position to a closed clamped position to clamp the second blank;

the welding unit operable to fuse the first and second weld edges of the blanks together.

2. A system as defined in claim 1, further comprising first and second lateral positioning means for respectively positioning the first and second blanks relative to the travel path.

3. A system as defined in claim 2 wherein each blank has a pair of side edges, and wherein each lateral positioning means includes (i) a pair of lateral abutment members, each for engaging a corresponding side edge, and (ii) a lateral servo positioner for positioning each lateral abutment member.

4. A system as defined in claim 3, further comprising lateral control means for incrementally controlling the lateral servo positioners.

5. A system as defined in claim 4 wherein each of the lateral abutment members includes an upwardly directed flange and a plurality of stop members mounted on the flange.

6. A system as defined in claim 1, wherein each of the clamp assemblies includes an upper clamp beam and a lower clamp beam, a plurality of clamp elements fastened to the upper beam and a clamp drive unit for displaying the upper clamp beam relative to the lower clamp beam between the open and closed positions.

7. A system as defined in claim 1 wherein the first displacement means includes at least one first engagement portion for engaging the first blank and a first drive portion for driving the first engagement portion.

8. A system as defined in claim 7 wherein the first engagement portion includes a first engagement member for engaging an edge on the first blank opposite the first weld edge, and wherein the first drive portion includes a first servo positioner which is aligned for movement along the travel path for displacing the first engagement member; and further comprising first control means for incrementally controlling the first servo positioner.

9. A system as defined in claim 8 wherein the first engagement member includes an upwardly directed flange and a blank abutment member mounted on the flange.

10. A system as defined in claim 9, further comprising a first actuator unit for actuating the blank abutment member between an operable position in the travel path and an inoperable position below the travel path.

11. A system as defined in claim 1, wherein the second displacement means includes at least one second engagement portion for engaging the second blank and a second drive portion for driving the second engagement portion.

12. A system as defined in claim 11 wherein the second engagement portion includes a second engagement member for engaging an edge of the second blank opposite the second weld edge, and wherein the second drive port on includes a second servo positioner which is aligned for movement along the travel path for displacing the second engagement member; and further comprising second control means for incrementally controlling the second servo positioner.

13. A system as defined in claim 12 wherein the second engagement member includes an upwardly directed flange and a blank abutment member mounted on the flange.

14. A system as defined in claim 13, further comprising a second actuator unit for actuating the blank abutment member between an operable position in the travel path and an inoperable position below the travel path.

15. A system as defined in claim 1 wherein the locating means includes (i) a locating member movable between an operable position in the travel path and a inoperable position below the travel path, and (ii) a locating drive assembly for driving the locating member between the operative and inoperative positions.

16. A system as defined in claim 15, wherein the locating drive assembly further comprises a carriage ember mounted for lateral movement relative to the travel path on a third servo positioner, the carriage supporting a vertically oriented actuator with an output shaft couple to the locating member, and third control means for incrementally controlling the third servo positioner.

17. A method of welding a pair of blanks, comprising:
a step for providing a travel path to carry a first blank and a second blank in a downstream direction;
a step for providing an upstream clamp assembly and a downstream clamp assembly positioned on the travel path, wherein the upstream clam assembly has an upper clamp portion and a lower clam portion, the upper and lower clamp portions having adjacent upper and lower clam surfaces respectively;
a step for opening the upstream and downstream clamp assemblies;
a step for conveying a first blank along the travel path and through the upstream clamp assembly to the downstream clamp assembly;
a step for positioning a welding unit at a weld location between the upstream and downstream clamp assemblies;
a step for interrupting the travel path at the weld location with at least one blank locator;
a step for reversing the direction of travel of the first blank and displacing the first blank until its trailing to-be-welded edge abuts the locator;

a step for clamping the downstream clamp assembly to clamp the first blank in its position against the locator;

a step for withdrawing the locator from the travel path;

a step for moving the upstream clamp assembly to an intermediate position, wherein the upper and lower clamp portions cooperate to guide the second blank and wherein the upper clamp portion moves relative to the lower clamp portion in a direction transverse to the travel path from the open position to an intermediate position with a predetermined spacing between the upper and lower clamp surfaces;

a step for conveying a second blank along the travel path to the upstream clamp assembly;

a step for displacing the second blank until its leading to-be-welded edge makes edge-to-edge contact with, the trailing to-be-welded edge of the first blank, wherein the predetermined spacing is selected to prevent the second blank from passing over the first blank;

a step for closing the upstream clamp assembly; and a step for operating the welding unit to form a weld seam along the abutting edges of the first and second blanks.

18. A method as defined in claim 17 wherein the step of withdrawing the locator from the travel path is carried out just before the arrival of the second blank at the upstream clamp assembly.

19. A method as defined in claim 17 wherein, in the step of moving the upstream clamp assembly to an intermediate position, the upper clamp portion is constrained to movement substantially perpendicular to the travel path.

20. A method as defined in claim 17 wherein, in the step for closing the upstream clamp assembly, the upper lamp portion is constrained to movement substantially perpendicular to the travel path.

21. A system as defined in claim 1 wherein the clamp assembly is operable to maintain the adjacent clamp surfaces substantially parallel to one another in the open, intermediate and closed positions.

22. A method as defined in claim 17 wherein the adjacent clamp surfaces are maintained substantially parallel to one another in the open, intermediate and closed positions.

23. A system as defined in claim 1 wherein the upstream clamp assembly includes a clamp drive unit having a pair of actuating cylinders, a first of the pair of actuating cylinders having an end-to-end displacement equals a distance from the open position to the intermediate position, and a second of the pair of actuating cylinders having an end-to-end displacement equals a distance from the intermediate position to the closed position.

24. A clamp device for a laser welding line, comprising:

a travel path to carry a thick blank and a thin blank in a downstream direction;

a upstream clamp assembly and a downstream clamp assembly positioned on the travel path;

the upstream and downstream clamp assemblies being movable to an open position to allow the thick blank to pass through the upstream clamp assembly to a first location within the downstream clamp assembly;

at least one locating means operable to interrupt the travel path at a second location between the upstream and downstream clamp assemblies after the thick blank has arrived at the firs location;

first displacement means to reverse the direction of the thick blank and to displace the thick blank from the first location in an upstream direction to a third location with its trailing to-be-welded edge abutting the locating means;

the downstream clamp assembly being movable from the open position to a closed clamped position to clamp the thick blank in the third position;

the locating means being operable to be removed from the travel path after the downstream clamp assembly is in its doped clamped position;

the upstream clamp assembly having an upper clamp portion defining an upper clamp surface and a lower clamp portion defining a lower clamp surface, wherein the upper and lower clamp surfaces are adjacent one another, the upper clamp port on being movable relative to the lower clamp portion in a direction transverse to the travel path from the open position to an intermediate position, which is selected to constrain the thin blank to pass through the upstream lamp assembly in a substantially coplanar relationship with the thick blank and to make edge to edge contact therewith, but not past the trailing edge of the thick black;

second displacement means for displacing the thin blank along the travel path to a fourth location with its leading to be-welded edge in abutment with the trailing to-be-welded edge of the thick blank; and the upstream clamp assembly being movable from the intermediate position to a closed clamped position to clamp the thin blank in the fourth position.

25. A device as defined in claim 24 wherein the first displacement means includes at least one engagement portion for engaging the thick blank and a drive portion for driving the engagement portion in order to deliver the thick blank to the third location.

26. A device as defined in claim 24 wherein the second displacement means includes at least one engagement portion for engaging the thin blank and a drive portion for driving the engagement portion in order to deliver the thin blank toward the fourth location.

27. A laser welding line assembly for welding a thick blank and a thin blank, comprising:

a welding station positioned at a weld location on a travel path for welding a trailing edge on the thick blank to a leading edge on the thin blank to form a weld seam;

a downstream clamp assembly located on a downstream side of the welding station to clamp the thick blank and an upstream clamp assembly located on an upstream side of the welding station to clamp the thin blank;

the upstream and downstream clamp assemblies being operable in an open position to permit the thick blank to travel in a downstream direction along the travel path through the upstream clamp assembly and the welding station to the down stream clamp assembly;

at least one locating means inoperable to interrupt the travel path adjacent the weld location;

first displacement means to displace the thick blank upstream to abut the location means to be located at the weld location;

the downstream clamp assembly being operable in a closed position to clamp the thick blank with the trailing edge at the weld location;

the locating means being operable to be removed from the travel path after the downstream clamp assembly is in the doped position;

the upstream clamp assembly having an upper clamp portion defining an upper clamp surface and a lower clamp portion defining a lower clamp surface, wherein the upper and lower clam surfaces are adjacent one another, the upper clamp port on being movable relative to the lower clamp portion in a direction transverse to the travel path from the open position to an intermediate position with a spacing sufficient to constrain the thin blank to travel along the travel path and through the upstream clamp assembly toward an edge to edge abutment position between the leading edge of the thin blank and the trailing edge of the thick blank;

second displacement means to displace the thin blank downstream to a location adjacent the weld location to abut the leading edge of the thin blank with the trailing edge of the thick blank; and the upstream clamp assembly being operable in a closed position to clamp the thin blank with its leading edge in the abutment position at the weld location.

28. A method of preparing a pair of blanks for a laser welding line, comprising:

a step for providing a travel path with an upstream clamp assembly and a downstream clamp assembly positioned thereon;

a step for providing the upstream clamp assembly with an upper clamp portion and a lower clamp portion and with the upper and lower clamp portions having adjacent upper and lower clamp surfaces respectively;

a step for delivering a thick blank and a thin blank to the travel path;

a step for moving the upstream and downstream clamp assemblies to an open position to allow the thick blank to pass through the upstream clamp assembly to a first location within the downstream clamp assembly;

a step for initiating at least one locating means to interrupt the travel path at a second location between the upstream and downstream clamp assemblies after the thick blank has arrived at the first location;

a step for reversing the direction of the thick blank and displacing the thick blank in an upstream direction from the first location to a third location with its trailing to-be-welded edge abutting the locating means;

a step for moving the downstream clamp assembly from the open position to a closed clamped position to clamp the thick blank in the third position;

a step for removing the locating means from the travel path after the downstream clamp assembly is in its closed clamped position;

a step for moving the upstream clamp assembly in a direction transverse to the travel path from the open position to an intermediate position, which is selected to constrain the thin blank to pass through the upstream clamp assembly in a substantially coplanar relationship with the thick blank and to make edge to edge contact therewith;

a step for displacing the thin blank to a fourth location with its leading to-be-welded edge in abutment with the trailing to-be-welded edge of the thick blank; and a step for moving the upstream clamp assembly from the intermediate position to a closed clamped position to clamp the thin blank in the fourth position.

29. A method as defined in claim 28 wherein the step of removing the locating means is carried out just before the arrival of the thin blank in the upstream clamp assembly.

30. A method as defined in claim 28 wherein, in the step of moving the upstream clamp assembly from the open position to the intermediate position, the upper clam is constrained to movement substantially perpendicular to the travel path.

31. A method as defined in claim 28 wherein, in the step for moving the upstream clamp assembly from the intermediate portion to the closed position, the upper clamp portion is constrained to movement substantially perpendicular to the travel path.

32. A method as defined in claim 28 wherein the adjacent clamp surfaces of the upstream clamp assembly are maintained substantially parallel to one another in the open, intermediate and closed positions.

33. A method of welding a pair of blanks, comprising:

a step for providing a travel path to carry a first blank and a second blank in a downstream direction;

a step for providing an upstream clamp assembly and a downstream clamp assembly positioned on the travel path, wherein the upstream clamp assembly has an upper clamp portion and a lower clamp portion, the upper and lower clamp portions having adjacent upper and lower clamp surfaces respectively;

a step for opening the upstream and downstream clamp assemblies;

a step for conveying a first blank along the travel path and through the upstream clamp assembly to the downstream clamp assembly;

a step for positioning a welding unit at a weld location between the upstream and downstream clamp assemblies;

a step for interrupting the travel path at the weld location with at least one blank locator;

a step for reversing the direction of travel of the first blank and displacing the first blank until its trailing to-be-welded edge abuts the locator;

a step for clamping the downstream clamp assembly to clamp the first blank in its position against the locator;

a step for withdrawing the locator from the travel path;

a step for moving the upstream clamp assembly to an intermediate position, wherein the upper and lower clamp portions cooperate to guide the second blank and wherein the upper clamp portion moves relative to the lower clamp portion in a direction transverse to the travel path from the open position to an intermediate position;

a step for conveying a second blank along the travel path to the upstream clamp assembly;

a step for displacing the second blank until its leading to-be-welded edge makes edge-to-edge contact with the trailing to-be-welded edge of the first blank, wherein at the intermediate position, the spacing between the upper and lower clamp portions is sufficient to constrain the second blank to travel through the upstream clamp assembly toward an edge to edge abutment position between the first and second blanks but not past the second blank;

a step for closing the upstream clamp assembly; and a step for operating the welding unit to form a weld seam along the abutting edges of the first and second blanks.

34. A method as defined in claim 33 wherein the step of withdrawing the locator from the travel path is carried out just before the arrival of the second blank at the upstream clamp assembly.

35. A method as defined in claim 33 wherein, in the step of moving the upstream clamp assembly to an intermediate position, the upper clamp portion is constrained to movement substantially perpendicular to the travel path.

36. A method as defined in claim 33 wherein, in the step for closing the upstream clamp assembly, the upper clamp portion is constrained to movement substantially perpendicular to the travel path.

37. A method as defined in claim 33 wherein the adjacent clamp surfaces are maintained substantially parallel to one another in the open, intermediate and closed positions.

* * * * *

UNITED STATES PATENT AND TRADEMARK OFFICE
CERTIFICATE OF CORRECTION

PATENT NO.   : 6,803,538 B2
DATED        : October 12, 2004
INVENTOR(S)  : Wright Christopher J. and Perry Warren It is certified that error appears in the above-identified patent and that said Letters Patent is hereby corrected as shown below:

Column 18,
Line 57, "travel path" should read -- a travel path --
Line 58, "downstream direction" should read -- a downstream direction --

Column 20,
Line 20, "port on" should read -- portion --.
Line 19, "ember" should read -- member --.
Lines 50 and 51, "clam" should read -- clamp --.

Column 21,
Line 32, "lamp" should read -- clamp --.
Line 62, "firs" should read -- first --.

Column 22,
Lines 6 and 59, "doped" should read -- closed --.
Line 15, "lamp" should read -- clamp --.
Line 20, "to be-welded" should read -- to-be-welded --.

Column 23,
Line 58, "clam" should read -- clamp --.

Signed and Sealed this

Nineteenth Day of April, 2005

JON W. DUDAS
*Director of the United States Patent and Trademark Office*